United States Patent
Petrovic et al.

(10) Patent No.: US 9,648,282 B2
(45) Date of Patent: May 9, 2017

(54) MEDIA MONITORING, MANAGEMENT AND INFORMATION SYSTEM

(75) Inventors: Rade Petrovic, San Diego, CA (US); Babak Tehranchi, San Diego, CA (US); Kanaan Jemili, San Diego, CA (US); Joseph M. Winograd, San Diego, CA (US); Dean Angelico, Carlsbad, CA (US)

(73) Assignee: Verance Corporation, San Diego, CA (US)

(*) Notice: Subject to any disclaimer, the term of this patent is extended or adjusted under 35 U.S.C. 154(b) by 1135 days.

(21) Appl. No.: 13/272,061

(22) Filed: Oct. 12, 2011

(65) Prior Publication Data

US 2012/0026393 A1    Feb. 2, 2012

Related U.S. Application Data

(63) Continuation of application No. 12/784,461, filed on May 20, 2010, which is a continuation of application (Continued)

(51) Int. Cl.
*H04N 21/435* (2011.01)
*H04N 7/173* (2011.01)
(Continued)

(52) U.S. Cl.
CPC ........ *H04N 7/17318* (2013.01); *H04H 20/14* (2013.01); *H04H 20/31* (2013.01);
(Continued)

(58) Field of Classification Search
CPC .............................. H04N 7/00; H04N 21/812
(Continued)

(56) References Cited

U.S. PATENT DOCUMENTS

| 3,406,344 A | 10/1968 | Hopper |
| 3,842,196 A | 10/1974 | Loughlin |

(Continued)

FOREIGN PATENT DOCUMENTS

| CA | 2276638 A1 | 1/2000 |
| EP | 282734 A1 | 9/1988 |

(Continued)

OTHER PUBLICATIONS

"Advanced Access Content System (AACS), Pre-recorded Video Book," Revision 0.951, Sep. 2009 (88 pages).

(Continued)

*Primary Examiner* — Jefferey Harold
*Assistant Examiner* — Sihar Karwan
(74) *Attorney, Agent, or Firm* — Perkins Coie LLP; Donald L. Wenskay

(57) ABSTRACT

Systems and methods are provided for monitoring transmissions of media content (such as audio and audiovisual content) in order to obtain independent and objective data regarding the use of specific media content recordings or works within the transmissions. Processing and reporting of such data is provided in various ways to serve a variety of business needs. Methods for employing content identification technology to efficiently and automatically obtain reliable, accurate, and precise monitoring data are also disclosed. Various information products and services based on such monitoring systems are proposed.

18 Claims, 9 Drawing Sheets

Related U.S. Application Data

No. 10/681,953, filed on Oct. 8, 2003, now Pat. No. 7,788,684.

(60) Provisional application No. 60/418,597, filed on Oct. 15, 2002.

(51) Int. Cl.

| | | |
|---|---|---|
| *H04H 20/14* | (2008.01) | |
| *H04H 20/31* | (2008.01) | |
| *H04N 21/258* | (2011.01) | |
| *H04N 21/439* | (2011.01) | |
| *H04N 21/81* | (2011.01) | |
| *H04N 21/8352* | (2011.01) | |
| *H04N 21/8358* | (2011.01) | |

(52) U.S. Cl.
CPC ....... *H04N 21/258* (2013.01); *H04N 21/4394* (2013.01); *H04N 21/812* (2013.01); *H04N 21/8352* (2013.01); *H04N 21/8358* (2013.01); *H04H 2201/50* (2013.01)

(58) Field of Classification Search
USPC .................. 713/176; 382/100; 348/462
See application file for complete search history.

(56) References Cited

U.S. PATENT DOCUMENTS

| | | |
|---|---|---|
| 3,885,217 A | 5/1975 | Cintron |
| 3,894,190 A | 7/1975 | Gassmann |
| 3,919,479 A | 11/1975 | Moon et al. |
| 3,973,206 A | 8/1976 | Haselwood et al. |
| 4,048,562 A | 9/1977 | Haselwood et al. |
| 4,176,379 A | 11/1979 | Wessler et al. |
| 4,199,788 A | 4/1980 | Tsujimura |
| 4,225,967 A | 9/1980 | Miwa et al. |
| 4,230,990 A | 10/1980 | Lert, Jr. et al. |
| 4,281,217 A | 7/1981 | Dolby |
| 4,295,128 A | 10/1981 | Hashemian et al. |
| 4,425,578 A | 1/1984 | Haselwood et al. |
| 4,454,610 A | 6/1984 | Sziklai |
| 4,464,656 A | 8/1984 | Nakamura |
| 4,497,060 A | 1/1985 | Yang |
| 4,512,013 A | 4/1985 | Nash et al. |
| 4,547,804 A | 10/1985 | Greenberg |
| 4,564,862 A | 1/1986 | Cohen |
| 4,593,904 A | 6/1986 | Graves |
| 4,639,779 A | 1/1987 | Greenberg |
| 4,669,089 A | 5/1987 | Gahagan et al. |
| 4,677,466 A | 6/1987 | Lert, Jr. et al. |
| 4,686,707 A | 8/1987 | Iwasaki et al. |
| 4,703,476 A | 10/1987 | Howard |
| 4,706,282 A | 11/1987 | Knowd |
| 4,723,302 A | 2/1988 | Fulmer et al. |
| 4,729,398 A | 3/1988 | Benson et al. |
| 4,739,398 A | 4/1988 | Thomas et al. |
| 4,750,173 A | 6/1988 | Bluthgen |
| 4,755,871 A | 7/1988 | Morales-Garza et al. |
| 4,755,884 A | 7/1988 | Efron et al. |
| 4,764,608 A | 8/1988 | Masuzawa et al. |
| 4,764,808 A | 8/1988 | Solar |
| 4,789,863 A | 12/1988 | Bush |
| 4,805,020 A | 2/1989 | Greenberg |
| 4,807,013 A | 2/1989 | Manocha |
| 4,807,031 A | 2/1989 | Broughton et al. |
| 4,840,602 A | 6/1989 | Rose |
| 4,843,562 A | 6/1989 | Kenyon et al. |
| 4,876,617 A | 10/1989 | Best et al. |
| 4,876,736 A | 10/1989 | Kiewit |
| 4,930,011 A | 5/1990 | Kiewit |
| 4,931,871 A | 6/1990 | Kramer |
| 4,937,807 A | 6/1990 | Weitz et al. |
| 4,939,515 A | 7/1990 | Adelson |
| 4,943,963 A | 7/1990 | Waechter et al. |
| 4,945,412 A | 7/1990 | Kramer |
| 4,967,273 A | 10/1990 | Greenberg |
| 4,969,041 A | 11/1990 | O'Grady et al. |
| 4,972,471 A | 11/1990 | Gross et al. |
| 4,972,503 A | 11/1990 | Zurlinden |
| 4,979,210 A | 12/1990 | Nagata et al. |
| 5,057,915 A | 10/1991 | Von Kohorn |
| 5,073,925 A | 12/1991 | Nagata et al. |
| 5,080,479 A | 1/1992 | Rosenberg |
| 5,113,437 A | 5/1992 | Best et al. |
| 5,116,437 A | 5/1992 | Yamamoto et al. |
| 5,161,251 A | 11/1992 | Mankovitz |
| 5,191,615 A | 3/1993 | Aldava et al. |
| 5,200,822 A | 4/1993 | Bronfin et al. |
| 5,210,820 A | 5/1993 | Kenyon |
| 5,210,831 A | 5/1993 | Emma et al. |
| 5,213,337 A | 5/1993 | Sherman |
| 5,214,792 A | 5/1993 | Alwadish |
| 5,237,611 A | 8/1993 | Rasmussen et al. |
| 5,251,041 A | 10/1993 | Young et al. |
| 5,270,480 A | 12/1993 | Hikawa |
| 5,294,962 A | 3/1994 | Sato et al. |
| 5,294,982 A | 3/1994 | Salomon et al. |
| 5,319,453 A | 6/1994 | Copriviza et al. |
| 5,319,735 A | 6/1994 | Preuss et al. |
| 5,351,304 A | 9/1994 | Yamamoto |
| 5,379,345 A | 1/1995 | Greenberg |
| 5,402,488 A | 3/1995 | Karlock |
| 5,404,160 A | 4/1995 | Schober et al. |
| 5,404,377 A | 4/1995 | Moses |
| 5,408,258 A | 4/1995 | Kolessar |
| 5,414,729 A | 5/1995 | Fenton |
| 5,424,785 A | 6/1995 | Orphan |
| 5,425,100 A | 6/1995 | Thomas et al. |
| 5,432,799 A | 7/1995 | Shimpuku et al. |
| 5,436,653 A | 7/1995 | Ellis et al. |
| 5,450,490 A | 9/1995 | Jensen et al. |
| 5,452,901 A | 9/1995 | Nakada et al. |
| 5,473,631 A | 12/1995 | Moses |
| 5,481,294 A | 1/1996 | Thomas et al. |
| 5,497,372 A | 3/1996 | Nankoh et al. |
| 5,502,576 A | 3/1996 | Ramsay et al. |
| 5,504,518 A | 4/1996 | Ellis et al. |
| 5,508,754 A | 4/1996 | Orphan |
| 5,519,454 A | 5/1996 | Willis |
| 5,523,794 A | 6/1996 | Mankovitz et al. |
| 5,526,427 A | 6/1996 | Thomas et al. |
| 5,537,484 A | 7/1996 | Kobayashi |
| 5,579,124 A | 11/1996 | Aijala et al. |
| 5,581,658 A | 12/1996 | O'Hagan et al. |
| 5,581,800 A | 12/1996 | Fardeau et al. |
| 5,592,553 A | 1/1997 | Guski et al. |
| 5,612,729 A | 3/1997 | Ellis et al. |
| 5,613,004 A | 3/1997 | Cooperman et al. |
| 5,636,292 A | 6/1997 | Rhoads |
| 5,664,018 A | 9/1997 | Leighton |
| 5,687,191 A | 11/1997 | Lee et al. |
| 5,687,236 A | 11/1997 | Moskowitz et al. |
| 5,699,427 A | 12/1997 | Chow et al. |
| 5,719,619 A | 2/1998 | Hattori et al. |
| 5,719,937 A | 2/1998 | Warren et al. |
| 5,737,329 A | 4/1998 | Horiguchi |
| 5,752,880 A | 5/1998 | Gabai et al. |
| 5,761,606 A | 6/1998 | Wolzien |
| 5,764,763 A | 6/1998 | Jensen et al. |
| 5,778,108 A | 7/1998 | Coleman, Jr. |
| 5,787,334 A | 7/1998 | Fardeau et al. |
| 5,805,635 A | 9/1998 | Andrews, Jr. et al. |
| 5,809,064 A | 9/1998 | Fenton et al. |
| 5,809,139 A | 9/1998 | Girod et al. |
| 5,819,289 A | 10/1998 | Sanford, II et al. |
| 5,822,360 A | 10/1998 | Lee et al. |
| 5,822,432 A | 10/1998 | Moskowitz et al. |
| 5,825,892 A | 10/1998 | Braudaway et al. |
| 5,828,325 A | 10/1998 | Wolosewicz et al. |
| 5,832,119 A | 11/1998 | Rhoads |
| 5,841,978 A | 11/1998 | Rhoads |
| 5,848,155 A | 12/1998 | Cox |
| 5,850,249 A | 12/1998 | Massetti et al. |

(56) References Cited

U.S. PATENT DOCUMENTS

| | | |
|---|---|---|
| 5,850,481 A | 12/1998 | Rhoads |
| 5,862,260 A | 1/1999 | Rhoads |
| 5,870,030 A | 2/1999 | DeLuca et al. |
| 5,887,243 A | 3/1999 | Harvey et al. |
| 5,889,868 A | 3/1999 | Moskowitz et al. |
| 5,892,900 A | 4/1999 | Ginter et al. |
| 5,893,067 A | 4/1999 | Bender et al. |
| 5,901,178 A | 5/1999 | Lee et al. |
| 5,905,800 A | 5/1999 | Moskowitz et al. |
| 5,930,369 A | 7/1999 | Cox et al. |
| 5,933,798 A | 8/1999 | Linnartz |
| 5,937,000 A | 8/1999 | Lee et al. |
| 5,940,124 A | 8/1999 | Janko et al. |
| 5,940,134 A | 8/1999 | Wirtz |
| 5,940,135 A | 8/1999 | Petrovic et al. |
| 5,940,429 A | 8/1999 | Lam et al. |
| 5,943,422 A | 8/1999 | Van Wie et al. |
| 5,945,932 A | 8/1999 | Smith et al. |
| 5,949,885 A | 9/1999 | Leighton |
| 5,960,081 A | 9/1999 | Vynne et al. |
| 5,963,909 A | 10/1999 | Warren et al. |
| 5,986,692 A | 11/1999 | Logan et al. |
| 6,021,432 A | 2/2000 | Sizer, II et al. |
| 6,031,914 A | 2/2000 | Tewfik et al. |
| 6,035,171 A | 3/2000 | Takaya et al. |
| 6,035,177 A | 3/2000 | Moses et al. |
| 6,037,984 A | 3/2000 | Isnardi et al. |
| 6,044,156 A | 3/2000 | Honsinger et al. |
| 6,061,793 A | 5/2000 | Tewfik et al. |
| 6,067,440 A | 5/2000 | Diefes |
| 6,078,664 A | 6/2000 | Moskowitz et al. |
| 6,094,228 A | 7/2000 | Ciardullo et al. |
| 6,101,310 A | 8/2000 | Terada et al. |
| 6,128,597 A | 10/2000 | Kolluru et al. |
| 6,145,081 A | 11/2000 | Winograd et al. |
| 6,154,571 A | 11/2000 | Cox et al. |
| 6,160,986 A | 12/2000 | Gabai et al. |
| 6,173,271 B1 | 1/2001 | Goodman et al. |
| 6,175,627 B1 | 1/2001 | Petrovic et al. |
| 6,189,123 B1 | 2/2001 | Anders Nystrom et al. |
| 6,209,092 B1 | 3/2001 | Linnartz |
| 6,209,094 B1 | 3/2001 | Levine et al. |
| 6,222,932 B1 | 4/2001 | Rao et al. |
| 6,229,572 B1 | 5/2001 | Ciardullo et al. |
| 6,233,347 B1 | 5/2001 | Chen et al. |
| 6,246,775 B1 | 6/2001 | Nakamura et al. |
| 6,246,802 B1 | 6/2001 | Fujihara et al. |
| 6,249,870 B1 | 6/2001 | Kobayashi et al. |
| 6,252,972 B1 | 6/2001 | Linnartz |
| 6,253,113 B1 | 6/2001 | Lu |
| 6,253,189 B1 | 6/2001 | Feezell et al. |
| 6,268,866 B1 | 7/2001 | Shibata |
| 6,278,792 B1 | 8/2001 | Cox et al. |
| 6,282,299 B1 | 8/2001 | Tewfik et al. |
| 6,285,774 B1 | 9/2001 | Schumann et al. |
| 6,289,108 B1 | 9/2001 | Rhoads |
| 6,290,566 B1 | 9/2001 | Gabai et al. |
| 6,330,335 B1 | 12/2001 | Rhoads |
| 6,330,672 B1 | 12/2001 | Shur |
| 6,332,031 B1 | 12/2001 | Rhoads et al. |
| 6,332,194 B1 | 12/2001 | Bloom et al. |
| 6,353,672 B1 | 3/2002 | Rhoads |
| 6,363,159 B1 | 3/2002 | Rhoads |
| 6,373,974 B2 | 4/2002 | Zeng |
| 6,374,036 B1 | 4/2002 | Ryan et al. |
| 6,381,341 B1 | 4/2002 | Rhoads |
| 6,385,330 B1 | 5/2002 | Powell et al. |
| 6,388,712 B1 | 5/2002 | Shinohara et al. |
| 6,389,152 B2 | 5/2002 | Nakamura et al. |
| 6,389,538 B1 | 5/2002 | Gruse et al. |
| 6,400,826 B1 | 6/2002 | Chen et al. |
| 6,400,827 B1 | 6/2002 | Rhoads |
| 6,404,781 B1 | 6/2002 | Kawamae et al. |
| 6,404,898 B1 | 6/2002 | Rhoads |
| 6,411,725 B1 | 6/2002 | Rhoads |
| 6,415,040 B1 | 7/2002 | Linnartz et al. |
| 6,415,041 B1 | 7/2002 | Oami et al. |
| 6,424,726 B2 | 7/2002 | Nakano et al. |
| 6,427,012 B1 | 7/2002 | Petrovic |
| 6,430,301 B1 | 8/2002 | Petrovic |
| 6,430,302 B2 | 8/2002 | Rhoads |
| 6,449,367 B2 | 9/2002 | Van Wie et al. |
| 6,449,496 B1 | 9/2002 | Beith et al. |
| 6,473,560 B1 | 10/2002 | Linnartz et al. |
| 6,477,431 B1 | 11/2002 | Kalker et al. |
| 6,487,301 B1 | 11/2002 | Zhao |
| 6,490,355 B1 | 12/2002 | Epstein |
| 6,496,591 B1 | 12/2002 | Rhoads |
| 6,505,160 B1 | 1/2003 | Levy et al. |
| 6,510,233 B1 | 1/2003 | Nakano |
| 6,510,234 B1 | 1/2003 | Cox et al. |
| 6,512,837 B1 | 1/2003 | Ahmed |
| 6,523,113 B1 | 2/2003 | Wehrenberg |
| 6,529,506 B1 | 3/2003 | Yamamoto et al. |
| 6,530,021 B1 | 3/2003 | Epstein et al. |
| 6,550,011 B1 | 4/2003 | Sims, III |
| 6,553,127 B1 | 4/2003 | Kurowski |
| 6,556,688 B1 | 4/2003 | Ratnakar |
| 6,557,103 B1 | 4/2003 | Boncelet, Jr. et al. |
| 6,570,996 B1 | 5/2003 | Linnartz |
| 6,571,144 B1 | 5/2003 | Moses et al. |
| 6,574,350 B1 | 6/2003 | Rhoads et al. |
| 6,577,744 B1 | 6/2003 | Braudaway et al. |
| 6,584,138 B1 | 6/2003 | Neubauer et al. |
| 6,590,996 B1 | 7/2003 | Reed et al. |
| 6,590,997 B2 | 7/2003 | Rhoads |
| 6,591,365 B1 | 7/2003 | Cookson |
| 6,592,516 B2 | 7/2003 | Lee |
| 6,598,162 B1 | 7/2003 | Moskowitz |
| 6,614,914 B1 | 9/2003 | Rhoads et al. |
| 6,618,484 B1 | 9/2003 | Van Wie et al. |
| 6,625,297 B1 | 9/2003 | Bradley |
| 6,628,729 B1 | 9/2003 | Sorensen |
| 6,633,653 B1 | 10/2003 | Hobson et al. |
| 6,636,615 B1 | 10/2003 | Rhoads et al. |
| 6,636,967 B1 | 10/2003 | Koyano |
| 6,647,128 B1 | 11/2003 | Rhoads |
| 6,647,129 B2 | 11/2003 | Rhoads |
| 6,654,501 B1 | 11/2003 | Acharya et al. |
| 6,661,905 B1 | 12/2003 | Chupp et al. |
| 6,665,419 B1 | 12/2003 | Oami |
| 6,668,068 B2 | 12/2003 | Hashimoto |
| 6,671,376 B1 | 12/2003 | Koto et al. |
| 6,671,388 B1 | 12/2003 | Op De Beeck et al. |
| 6,674,861 B1 | 1/2004 | Xu et al. |
| 6,674,876 B1 | 1/2004 | Hannigan et al. |
| 6,675,146 B2 | 1/2004 | Rhoads |
| 6,678,389 B1 | 1/2004 | Sun et al. |
| 6,681,029 B1 | 1/2004 | Rhoads |
| 6,683,958 B2 | 1/2004 | Petrovic |
| 6,697,944 B1 | 2/2004 | Jones et al. |
| 6,700,990 B1 | 3/2004 | Rhoads |
| 6,704,431 B1 | 3/2004 | Ogawa et al. |
| 6,707,926 B1 | 3/2004 | Macy et al. |
| 6,721,439 B1 | 4/2004 | Levy et al. |
| 6,728,390 B2 | 4/2004 | Rhoads et al. |
| 6,737,957 B1 | 5/2004 | Petrovic et al. |
| 6,738,495 B2 | 5/2004 | Rhoads et al. |
| 6,744,906 B2 | 6/2004 | Rhoads et al. |
| 6,748,360 B2 | 6/2004 | Pitman et al. |
| 6,751,337 B2 | 6/2004 | Tewfik et al. |
| 6,757,908 B1 | 6/2004 | Vogel |
| 6,768,807 B1 | 7/2004 | Muratani |
| 6,771,797 B2 | 8/2004 | Ahmed |
| 6,785,399 B2 | 8/2004 | Fujihara |
| 6,785,401 B2 | 8/2004 | Walker et al. |
| 6,785,815 B1 | 8/2004 | Serret-Avila et al. |
| 6,792,542 B1 | 9/2004 | Lee et al. |
| 6,798,893 B1 | 9/2004 | Tanaka |
| 6,801,999 B1 | 10/2004 | Venkatesan et al. |
| 6,823,455 B1 | 11/2004 | Macy et al. |
| 6,829,368 B2 | 12/2004 | Meyer et al. |
| 6,829,582 B1 | 12/2004 | Barsness |
| 6,834,344 B1 | 12/2004 | Aggarwal et al. |

(56) References Cited

U.S. PATENT DOCUMENTS

| | | |
|---|---|---|
| 6,834,345 B2 | 12/2004 | Bloom et al. |
| 6,850,555 B1 | 2/2005 | Barclay |
| 6,850,626 B2 | 2/2005 | Rhoads et al. |
| 6,856,693 B2 | 2/2005 | Miller |
| 6,871,180 B1 | 3/2005 | Neuhauser et al. |
| 6,880,082 B2 | 4/2005 | Ohta |
| 6,888,943 B1 | 5/2005 | Lam et al. |
| 6,891,958 B2 | 5/2005 | Kirovski et al. |
| 6,912,010 B2 | 6/2005 | Baker et al. |
| 6,912,294 B2 | 6/2005 | Wang et al. |
| 6,912,315 B1 | 6/2005 | Wong et al. |
| 6,915,002 B2 | 7/2005 | Gustafson |
| 6,915,422 B1 | 7/2005 | Nakamura |
| 6,915,481 B1 | 7/2005 | Tewfik et al. |
| 6,928,233 B1 | 8/2005 | Walker et al. |
| 6,931,536 B2 | 8/2005 | Hollar |
| 6,944,313 B1 | 9/2005 | Donescu |
| 6,944,771 B2 | 9/2005 | Epstein |
| 6,947,893 B1 | 9/2005 | Iwaki et al. |
| 6,952,774 B1 | 10/2005 | Kirovski et al. |
| 6,954,541 B2 | 10/2005 | Fan et al. |
| 6,961,854 B2 | 11/2005 | Serret-Avila et al. |
| 6,973,195 B1 | 12/2005 | Matsui |
| 6,993,154 B2 | 1/2006 | Brunk |
| 6,996,249 B2 | 2/2006 | Miller et al. |
| 7,007,166 B1 | 2/2006 | Moskowitz et al. |
| 7,020,304 B2 | 3/2006 | Alattar et al. |
| 7,024,018 B2 | 4/2006 | Petrovic |
| 7,043,049 B2 | 5/2006 | Kuzma |
| 7,043,536 B1 | 5/2006 | Philyaw et al. |
| 7,043,638 B2 | 5/2006 | McGrath et al. |
| 7,046,808 B1 | 5/2006 | Metois et al. |
| 7,054,461 B2 | 5/2006 | Zeller et al. |
| 7,054,462 B2 | 5/2006 | Rhoads et al. |
| 7,058,809 B2 | 6/2006 | White et al. |
| 7,058,815 B2 | 6/2006 | Morin |
| 7,068,809 B2 | 6/2006 | Stach |
| 7,072,492 B2 | 7/2006 | Ogawa et al. |
| 7,103,678 B2 | 9/2006 | Asai et al. |
| 7,107,452 B2 | 9/2006 | Serret-Avila et al. |
| 7,111,169 B2 | 9/2006 | Ripley et al. |
| 7,113,613 B2 | 9/2006 | Echizen et al. |
| 7,142,691 B2 | 11/2006 | Levy |
| 7,162,642 B2 | 1/2007 | Schumann et al. |
| 7,164,778 B1 | 1/2007 | Nakamura et al. |
| 7,167,599 B1 | 1/2007 | Diehl |
| 7,171,020 B2 | 1/2007 | Rhoads et al. |
| 7,177,429 B2 | 2/2007 | Moskowitz et al. |
| 7,197,368 B2 | 3/2007 | Kirovski et al. |
| 7,206,649 B2 | 4/2007 | Kirovski et al. |
| 7,224,819 B2 | 5/2007 | Levy et al. |
| 7,231,061 B2 | 6/2007 | Bradley |
| 7,289,643 B2 | 10/2007 | Brunk et al. |
| 7,298,865 B2 | 11/2007 | Lubin et al. |
| 7,319,759 B1 | 1/2008 | Peinado et al. |
| 7,321,666 B2 | 1/2008 | Kunisa |
| 7,334,247 B1 | 2/2008 | Finseth et al. |
| 7,336,802 B2 | 2/2008 | Kunisa |
| 7,346,514 B2 | 3/2008 | Herre et al. |
| 7,369,677 B2 | 5/2008 | Petrovic et al. |
| 7,389,421 B2 | 6/2008 | Kirovski et al. |
| 7,430,670 B1 | 9/2008 | Horning et al. |
| 7,450,727 B2 | 11/2008 | Griesinger |
| 7,454,019 B2 | 11/2008 | Williams |
| 7,562,392 B1 | 7/2009 | Rhoads et al. |
| 7,581,103 B2 | 8/2009 | Home et al. |
| 7,587,601 B2 | 9/2009 | Levy et al. |
| 7,616,776 B2 | 11/2009 | Petrovic et al. |
| 7,617,509 B1 | 11/2009 | Brunheroto et al. |
| 7,630,497 B2 | 12/2009 | Lotspiech et al. |
| 7,644,282 B2 | 1/2010 | Petrovic et al. |
| 7,660,991 B2 | 2/2010 | Nakamura et al. |
| 7,664,332 B2 | 2/2010 | Wong et al. |
| 7,693,297 B2 | 4/2010 | Zhang et al. |
| 7,698,570 B2 | 4/2010 | Schumann et al. |
| 7,788,684 B2 | 8/2010 | Petrovic et al. |
| 7,788,693 B2 | 8/2010 | Robbins |
| 7,818,763 B2 | 10/2010 | Sie et al. |
| 7,840,006 B2 | 11/2010 | Ogawa et al. |
| 7,979,881 B1 | 7/2011 | Wong et al. |
| 7,983,922 B2 | 7/2011 | Neusinger et al. |
| 7,986,806 B2 | 7/2011 | Rhoads |
| 7,991,995 B2 | 8/2011 | Rabin et al. |
| 8,005,258 B2 | 8/2011 | Petrovic et al. |
| 8,015,410 B2 | 9/2011 | Pelly et al. |
| 8,055,013 B2 | 11/2011 | Levy et al. |
| 8,059,815 B2 | 11/2011 | Lofgren et al. |
| 8,155,463 B2 | 4/2012 | Wong et al. |
| 8,189,861 B1 | 5/2012 | Rucklidge |
| 8,194,803 B2 | 6/2012 | Baum et al. |
| 8,249,992 B2 | 8/2012 | Harkness et al. |
| 8,315,835 B2 | 11/2012 | Tian et al. |
| 8,346,532 B2 | 1/2013 | Chakra et al. |
| 8,467,717 B2 | 6/2013 | Croy et al. |
| 8,538,066 B2 | 9/2013 | Petrovic et al. |
| 8,589,969 B2 | 11/2013 | Falcon |
| 2001/0001159 A1 | 5/2001 | Ford |
| 2001/0021926 A1 | 9/2001 | Schneck et al. |
| 2001/0022786 A1 | 9/2001 | King et al. |
| 2001/0044899 A1 | 11/2001 | Levy |
| 2001/0051996 A1 | 12/2001 | Cooper et al. |
| 2001/0054146 A1 | 12/2001 | Carro et al. |
| 2002/0007403 A1 | 1/2002 | Echizen et al. |
| 2002/0012443 A1 | 1/2002 | Rhoads et al. |
| 2002/0033844 A1 | 3/2002 | Levy et al. |
| 2002/0044659 A1 | 4/2002 | Ohta |
| 2002/0052885 A1 | 5/2002 | Levy |
| 2002/0053026 A1 | 5/2002 | Hashimoto |
| 2002/0054089 A1 | 5/2002 | Nicholas et al. |
| 2002/0068987 A1 | 6/2002 | Hars |
| 2002/0080964 A1 | 6/2002 | Stone et al. |
| 2002/0080976 A1 | 6/2002 | Schreer |
| 2002/0082731 A1 | 6/2002 | Pitman et al. |
| 2002/0095577 A1 | 7/2002 | Nakamura et al. |
| 2002/0097873 A1 | 7/2002 | Petrovic |
| 2002/0120849 A1* | 8/2002 | McKinley ......... G06F 17/30817 713/176 |
| 2002/0120854 A1 | 8/2002 | LeVine et al. |
| 2002/0126842 A1 | 9/2002 | Hollar |
| 2002/0126872 A1 | 9/2002 | Brunk et al. |
| 2002/0138734 A1 | 9/2002 | David et al. |
| 2002/0154144 A1 | 10/2002 | Lofgren et al. |
| 2002/0168087 A1 | 11/2002 | Petrovic |
| 2002/0178368 A1 | 11/2002 | Yin et al. |
| 2002/0199106 A1 | 12/2002 | Hayashi |
| 2003/0009671 A1 | 1/2003 | Yacobi et al. |
| 2003/0012098 A1 | 1/2003 | Sako et al. |
| 2003/0012403 A1 | 1/2003 | Rhoads et al. |
| 2003/0016825 A1 | 1/2003 | Jones |
| 2003/0021439 A1 | 1/2003 | Lubin et al. |
| 2003/0021441 A1 | 1/2003 | Levy et al. |
| 2003/0028796 A1 | 2/2003 | Roberts et al. |
| 2003/0031317 A1 | 2/2003 | Epstein |
| 2003/0033321 A1 | 2/2003 | Schrempp et al. |
| 2003/0037075 A1 | 2/2003 | Hannigan et al. |
| 2003/0053655 A1 | 3/2003 | Barone, Jr. et al. |
| 2003/0056213 A1 | 3/2003 | McFaddin et al. |
| 2003/0061489 A1 | 3/2003 | Pelly et al. |
| 2003/0063747 A1 | 4/2003 | Petrovic |
| 2003/0072468 A1 | 4/2003 | Brunk et al. |
| 2003/0076955 A1 | 4/2003 | Alve et al. |
| 2003/0078891 A1 | 4/2003 | Capitant |
| 2003/0081809 A1 | 5/2003 | Fridrich et al. |
| 2003/0112974 A1 | 6/2003 | Levy |
| 2003/0112997 A1 | 6/2003 | Ahmed |
| 2003/0115504 A1 | 6/2003 | Holliman et al. |
| 2003/0131350 A1 | 7/2003 | Peiffer et al. |
| 2003/0152225 A1 | 8/2003 | Kunisa |
| 2003/0174862 A1 | 9/2003 | Rhoads et al. |
| 2003/0177359 A1 | 9/2003 | Bradley |
| 2003/0179901 A1 | 9/2003 | Tian et al. |
| 2003/0185417 A1 | 10/2003 | Alattar et al. |
| 2003/0187679 A1 | 10/2003 | Odgers et al. |
| 2003/0188166 A1 | 10/2003 | Pelly et al. |

(56) References Cited

U.S. PATENT DOCUMENTS

| | | |
|---|---|---|
| 2003/0190054 A1 | 10/2003 | Troyansky et al. |
| 2003/0190055 A1 | 10/2003 | Kalker et al. |
| 2003/0193616 A1* | 10/2003 | Baker .................... G11B 27/10 348/515 |
| 2003/0200438 A1 | 10/2003 | Kirovski et al. |
| 2003/0223584 A1 | 12/2003 | Bradley et al. |
| 2004/0005076 A1 | 1/2004 | Hosaka et al. |
| 2004/0008864 A1 | 1/2004 | Watson et al. |
| 2004/0009763 A1 | 1/2004 | Stone et al. |
| 2004/0010692 A1 | 1/2004 | Watson |
| 2004/0015400 A1 | 1/2004 | Whymark |
| 2004/0025176 A1 | 2/2004 | Franklin et al. |
| 2004/0028255 A1 | 2/2004 | Miller |
| 2004/0042635 A1 | 3/2004 | Epstein et al. |
| 2004/0042636 A1 | 3/2004 | Oh |
| 2004/0073916 A1 | 4/2004 | Petrovic et al. |
| 2004/0078575 A1 | 4/2004 | Morten et al. |
| 2004/0088556 A1 | 5/2004 | Weirauch |
| 2004/0091111 A1 | 5/2004 | Levy et al. |
| 2004/0093202 A1 | 5/2004 | Fischer et al. |
| 2004/0093523 A1 | 5/2004 | Matsuzaki et al. |
| 2004/0098593 A1 | 5/2004 | Muratani |
| 2004/0101160 A1 | 5/2004 | Kunisa |
| 2004/0103293 A1 | 5/2004 | Ryan |
| 2004/0111740 A1 | 6/2004 | Seok et al. |
| 2004/0133794 A1 | 7/2004 | Kocher et al. |
| 2004/0136531 A1 | 7/2004 | Asano et al. |
| 2004/0151316 A1 | 8/2004 | Petrovic |
| 2004/0169581 A1 | 9/2004 | Petrovic et al. |
| 2004/0174996 A1 | 9/2004 | Tewfik et al. |
| 2004/0202324 A1 | 10/2004 | Yamaguchi et al. |
| 2004/0204943 A1 | 10/2004 | Kirovski et al. |
| 2004/0216157 A1 | 10/2004 | Shain et al. |
| 2004/0250078 A1 | 12/2004 | Stach et al. |
| 2004/0258274 A1 | 12/2004 | Brundage et al. |
| 2005/0008190 A1 | 1/2005 | Levy et al. |
| 2005/0010779 A1 | 1/2005 | Kobayashi et al. |
| 2005/0013462 A1 | 1/2005 | Rhoads |
| 2005/0025332 A1 | 2/2005 | Seroussi |
| 2005/0050332 A1 | 3/2005 | Serret-Avila et al. |
| 2005/0071669 A1 | 3/2005 | Medvinsky et al. |
| 2005/0120220 A1 | 6/2005 | Oostveen et al. |
| 2005/0144632 A1 | 6/2005 | Mears et al. |
| 2005/0154891 A1 | 7/2005 | Skipper |
| 2005/0196051 A1 | 9/2005 | Wong et al. |
| 2005/0202781 A1 | 9/2005 | Steelberg et al. |
| 2005/0242568 A1 | 11/2005 | Long et al. |
| 2005/0251683 A1 | 11/2005 | Levy et al. |
| 2006/0005029 A1 | 1/2006 | Petrovic et al. |
| 2006/0056653 A1 | 3/2006 | Kunisa |
| 2006/0062426 A1 | 3/2006 | Levy et al. |
| 2006/0075424 A1 | 4/2006 | Talstra et al. |
| 2006/0104477 A1 | 5/2006 | Isogai et al. |
| 2006/0140406 A1* | 6/2006 | Van Der Veen ...... G10L 13/033 380/202 |
| 2006/0227968 A1 | 10/2006 | Chen et al. |
| 2006/0239501 A1 | 10/2006 | Petrovic et al. |
| 2007/0003103 A1 | 1/2007 | Lemma et al. |
| 2007/0005500 A1 | 1/2007 | Steeves et al. |
| 2007/0033146 A1 | 2/2007 | Hollar |
| 2007/0039018 A1 | 2/2007 | Saslow et al. |
| 2007/0100483 A1 | 5/2007 | Kentish et al. |
| 2007/0110237 A1 | 5/2007 | Tehranchi et al. |
| 2007/0143617 A1 | 6/2007 | Farber et al. |
| 2007/0150418 A1 | 6/2007 | Ben-Menahem et al. |
| 2007/0168673 A1 | 7/2007 | Van Der Veen et al. |
| 2007/0177761 A1 | 8/2007 | Levy |
| 2007/0192261 A1 | 8/2007 | Kelkar et al. |
| 2007/0208711 A1 | 9/2007 | Rhoads et al. |
| 2007/0214049 A1 | 9/2007 | Postrel |
| 2007/0223708 A1 | 9/2007 | Villemoes et al. |
| 2008/0002854 A1 | 1/2008 | Tehranchi et al. |
| 2008/0016360 A1 | 1/2008 | Rodriguez et al. |
| 2008/0031463 A1 | 2/2008 | Davis |
| 2008/0209219 A1 | 8/2008 | Rhein |
| 2008/0228733 A1 | 9/2008 | Davis et al. |
| 2008/0273861 A1 | 11/2008 | Yang et al. |
| 2008/0298632 A1 | 12/2008 | Reed |
| 2008/0310629 A1 | 12/2008 | Van Der Veen et al. |
| 2008/0310673 A1 | 12/2008 | Petrovic et al. |
| 2008/0313741 A1 | 12/2008 | Alve et al. |
| 2009/0031134 A1 | 1/2009 | Levy |
| 2009/0033617 A1 | 2/2009 | Lindberg et al. |
| 2009/0158318 A1 | 6/2009 | Levy |
| 2009/0172405 A1 | 7/2009 | Shiomi et al. |
| 2009/0175594 A1 | 7/2009 | Ann et al. |
| 2009/0177674 A1 | 7/2009 | Yoshida |
| 2009/0262932 A1 | 10/2009 | Petrovic |
| 2009/0319639 A1 | 12/2009 | Gao et al. |
| 2009/0326961 A1 | 12/2009 | Petrovic et al. |
| 2010/0034513 A1 | 2/2010 | Nakano et al. |
| 2010/0115267 A1 | 5/2010 | Guo et al. |
| 2010/0121608 A1 | 5/2010 | Tian et al. |
| 2010/0146286 A1 | 6/2010 | Petrovic et al. |
| 2010/0159425 A1 | 6/2010 | Hamlin |
| 2010/0162352 A1 | 6/2010 | Haga et al. |
| 2010/0214307 A1 | 8/2010 | Lee et al. |
| 2010/0226525 A1 | 9/2010 | Levy et al. |
| 2010/0228632 A1 | 9/2010 | Rodriguez |
| 2010/0228857 A1 | 9/2010 | Petrovic et al. |
| 2010/0287579 A1 | 11/2010 | Petrovic et al. |
| 2010/0287609 A1 | 11/2010 | Gonzalez et al. |
| 2011/0016172 A1 | 1/2011 | Shah |
| 2011/0068898 A1 | 3/2011 | Petrovic et al. |
| 2011/0091066 A1 | 4/2011 | Alattar |
| 2011/0103444 A1 | 5/2011 | Baum et al. |
| 2011/0123063 A1 | 5/2011 | Delp et al. |
| 2011/0173210 A1 | 7/2011 | Ahn et al. |
| 2011/0202687 A1 | 8/2011 | Glitsch et al. |
| 2011/0209191 A1 | 8/2011 | Shah |
| 2011/0219229 A1 | 9/2011 | Cholas et al. |
| 2011/0225427 A1 | 9/2011 | Wood et al. |
| 2011/0235908 A1 | 9/2011 | Ke et al. |
| 2011/0286625 A1 | 11/2011 | Petrovic et al. |
| 2011/0293090 A1 | 12/2011 | Ayaki et al. |
| 2011/0311056 A1 | 12/2011 | Winograd |
| 2011/0320627 A1 | 12/2011 | Landow et al. |
| 2012/0017091 A1 | 1/2012 | Petrovic et al. |
| 2012/0072729 A1 | 3/2012 | Winograd et al. |
| 2012/0072730 A1 | 3/2012 | Winograd et al. |
| 2012/0072731 A1 | 3/2012 | Winograd et al. |
| 2012/0084870 A1 | 4/2012 | Petrovic |
| 2012/0130719 A1 | 5/2012 | Petrovic et al. |
| 2012/0203556 A1 | 8/2012 | Villette et al. |
| 2012/0265735 A1 | 10/2012 | McMillan et al. |
| 2012/0300977 A1 | 11/2012 | Petrovic et al. |
| 2013/0007462 A1 | 1/2013 | Petrovic et al. |
| 2013/0011006 A1 | 1/2013 | Petrovic et al. |
| 2013/0031579 A1 | 1/2013 | Klappert |
| 2013/0073065 A1 | 3/2013 | Chen et al. |
| 2013/0108101 A1 | 5/2013 | Petrovic et al. |
| 2013/0114847 A1 | 5/2013 | Petrovic et al. |
| 2013/0114848 A1 | 5/2013 | Petrovic et al. |
| 2013/0117570 A1 | 5/2013 | Petrovic et al. |
| 2013/0117571 A1 | 5/2013 | Petrovic et al. |
| 2013/0129303 A1 | 5/2013 | Lee et al. |
| 2013/0132727 A1 | 5/2013 | Petrovic |
| 2013/0142382 A1 | 6/2013 | Petrovic et al. |
| 2013/0151855 A1 | 6/2013 | Petrovic et al. |
| 2013/0151856 A1 | 6/2013 | Petrovic et al. |
| 2013/0152210 A1 | 6/2013 | Petrovic et al. |
| 2013/0283402 A1 | 10/2013 | Petrovic |
| 2013/0339029 A1 | 12/2013 | Petrovic et al. |
| 2014/0029786 A1 | 1/2014 | Winograd |
| 2014/0067950 A1 | 3/2014 | Winograd |
| 2014/0071342 A1 | 3/2014 | Winograd et al. |
| 2014/0074855 A1 | 3/2014 | Zhao et al. |
| 2014/0075465 A1 | 3/2014 | Petrovic et al. |

(56) References Cited

U.S. PATENT DOCUMENTS

| | | | |
|---|---|---|---|
| 2014/0075466 | A1 | 3/2014 | Zhao |
| 2014/0075469 | A1 | 3/2014 | Zhao |

FOREIGN PATENT DOCUMENTS

| | | | |
|---|---|---|---|
| EP | 372601 A1 | 6/1990 | |
| EP | 581317 A2 | 2/1994 | |
| EP | 2166725 | 3/2010 | |
| GB | 2260246 A | 4/1993 | |
| GB | 2292506 A | 2/1996 | |
| GB | 2363027 A | 12/2001 | |
| JP | 10-150548 A | 6/1998 | |
| JP | 11-086435 A | 3/1999 | |
| JP | 11-284516 A | 10/1999 | |
| JP | 11-346302 A | 12/1999 | |
| JP | 2000-069273 A | 3/2000 | |
| JP | 2000083159 A | 3/2000 | |
| JP | 2000-174628 A | 6/2000 | |
| JP | 2000163870 | 6/2000 | |
| JP | 2000216981 A | 8/2000 | |
| JP | 2001022366 A | 1/2001 | |
| JP | 2001-119555 A | 4/2001 | |
| JP | 2001175270 A | 6/2001 | |
| JP | 2001-188549 A | 7/2001 | |
| JP | 2001-216763 A | 8/2001 | |
| JP | 2001-218006 A | 8/2001 | |
| JP | 2001245132 | 9/2001 | |
| JP | 2001257865 | 9/2001 | |
| JP | 2001-312570 A | 11/2001 | |
| JP | 2001-527660 A | 12/2001 | |
| JP | 2001339700 | 12/2001 | |
| JP | 2002-010057 A | 1/2002 | |
| JP | 2002-024095 A | 1/2002 | |
| JP | 2002-027223 A | 1/2002 | |
| JP | 2002-091465 A | 3/2002 | |
| JP | 2002091712 | 3/2002 | |
| JP | 2002100116 | 4/2002 | |
| JP | 2002125205 | 4/2002 | |
| JP | 2002135557 A | 5/2002 | |
| JP | 2002-165191 A | 6/2002 | |
| JP | 2002176614 | 6/2002 | |
| JP | 2002-519916 A | 7/2002 | |
| JP | 2002-232693 A | 8/2002 | |
| JP | 2002232412 A | 8/2002 | |
| JP | 2002319924 | 10/2002 | |
| JP | 2002354232 | 12/2002 | |
| JP | 2003-008873 A | 1/2003 | |
| JP | 2003-039770 A | 2/2003 | |
| JP | 2003-091927 A | 3/2003 | |
| JP | 2003-230095 A | 8/2003 | |
| JP | 2003-244419 A | 8/2003 | |
| JP | 2003-283802 A | 10/2003 | |
| JP | 2003316556 | 11/2003 | |
| JP | 2003348324 | 12/2003 | |
| JP | 2004-023786 A | 1/2004 | |
| JP | 2004070606 | 3/2004 | |
| JP | 2004-163855 A | 6/2004 | |
| JP | 2004173237 A | 6/2004 | |
| JP | 2004-193843 A | 7/2004 | |
| JP | 2004194233 | 7/2004 | |
| JP | 2004-328747 A | 11/2004 | |
| JP | 2005051733 | 2/2005 | |
| JP | 2005-094107 A | 4/2005 | |
| JP | 2005525600 A | 8/2005 | |
| JP | 20080539669 | 11/2008 | |
| JP | 20100272920 | 12/2010 | |
| JP | 5283732 | 7/2013 | |
| KR | 20100009384 | 1/2010 | |
| WO | WO-94-10771 | 5/1994 | |
| WO | WO-95-14289 | 5/1995 | |
| WO | WO-97-09797 | 3/1997 | |
| WO | WO-97-33391 | 9/1997 | |
| WO | WO-98-53565 | 11/1998 | |
| WO | WO-99-03340 | 1/1999 | |
| WO | WO-99-39344 | 5/1999 | |
| WO | WO-99-45706 | 10/1999 | |
| WO | WO-99-62022 | 12/1999 | |
| WO | WO-00-00969 | 1/2000 | |
| WO | WO-00-13136 | 3/2000 | |
| WO | WO-00-56059 | 9/2000 | |
| WO | WO-01-54035 | 7/2001 | |
| WO | WO-01-55889 | 8/2001 | |
| WO | WO-0197128 A1 | 12/2001 | |
| WO | WO-0223883 A2 | 3/2002 | |
| WO | 0249363 | 6/2002 | |
| WO | WO-02095727 | 11/2002 | |
| WO | WO-03052598 A1 | 6/2003 | |
| WO | 03102947 | 12/2003 | |
| WO | 2005017827 | 2/2005 | |
| WO | WO-2005-027501 | 3/2005 | |
| WO | 2006051043 | 5/2006 | |
| WO | WO-2006051043 A1 | 5/2006 | |
| WO | 2006116394 | 11/2006 | |
| WO | WO-2006116394 A2 | 11/2006 | |
| WO | 2010073236 | 7/2010 | |
| WO | WO-2010073236 A1 | 7/2010 | |
| WO | 2013067439 | 5/2013 | |
| WO | 2013090462 | 6/2013 | |
| WO | 2013090466 | 6/2013 | |
| WO | 2013090467 | 6/2013 | |

OTHER PUBLICATIONS

"Content Protection—Self Protecting Digital Content," http://www.cryptography.com/technology/spdc/index.html, May 2010.

"Microsoft response to CfP for technology solutions to screen digital audio content for LCM acceptance," *Microsoft Corporation*, May 23, 1999.

"TASK AC122—copy protection for distribution services," Http://acad.bg/WISE/english/rd/partners/acts/areal/ac122-t.html, Jul. 1, 1997.

Adelsbach, A., et al., "Proving Ownership of Digital Content," *Proc. 3rd Int. Workshop on Information Hiding*, 1768:117-133, Sep. 1999.

Aggarwal, A., et al., "Multi-Layer Grid Embeddings," Foundations of Computer Science, 26th Annual Symposium on Foundations of Computer Science, 85:186-196, Oct. 1985.

Aris Technologies, Inc. "Audio Watermarking System to Screen Digital Audio Content for LCM Acceptance," May 1999 (17 pages).

Barreto, P.S.L.M., et al. "Toward Secure Public-Key Blockwise Fragile Authentication Watermarking," *IEEE Proceedings Vision, Image, and Signal Processing*, 149(2):57-62, Apr. 2002.

Boney, L., et al., "Digital Watermarks for Audio Signals," *Dept. of Electrical Engineering, Univ. of Minnesota*, Mar. 1996 (4 pages).

Cappellini, V., et al. "Robust Frame-based Watermarking for Digital Video," *Proceedings of the 12th International Workshop on Database and Expert Systems Applications*, Sep. 2001 (5 pages).

Caronni, G., "Assuring Ownership Rights for Digital Images," Proceedings of reliable IT systems VIS 95, Vieweg Publishing Company, Germany, 1995 (10 pages).

Chen, B., et al., "Quantization index modulation: a class of provably good methods for digital watermarking and information embedding," *IEEE Transactions on Information Theory*, 47(4):1423-1443 May 2001.

Chou, J., et al., "A Robust Blind Watermarking Scheme based on Distributed Source Coding Principles," *Multimedial 2000 Proceedings of the eighth ACM international conference on multimedia*, Los Angeles, California, 2000 (8 pages).

Chou, J., et al., "A Robust Optimization Solution to the Data Hiding Problem using Distributed Source Coding Principles," *Pro. SPIE*, 3971, San Jose, California, Jan. 2000 (10 pages).

Cinea, Inc., "Forensic watermarking deterring video piracy," 2004, (9 pages). [http://www.cinea.com/whitepapers/forensic_watermarking.pdf].

Costa, M., "Writing on Dirty Paper," *IEEE Trans. on Info. Theory*, 29(3):439-441, May 1983.

Cox, I. J., et al., "Some general methods for tampering with watermarks," *IEEE Journal on Selected Areas in Communications*, 16(4): 587-593, May 1998.

(56) References Cited

OTHER PUBLICATIONS

Coxford, A., et al., "Advanced Mathematics: A Preparation for Calculus, Second Edition," *Harcourt Brace Jovanovish, Inc.*, 1978 (14 pages).

Das, et al "Distributed Priority Queues on Hybercube Architectures," IEEE, 1996, pp. 620-627.

Davidson, M.F., "Music File Filter," *Sony Music, New York*, May 23, 1999 (2 pages).

Digimarc Corporation, "Digimarc Watermarking Guide," 1999 (22 pages).

Dittmann, J., "Combining digital watermarks and collusion secure fingerprints for customer copy monitoring," *Proc. IEEE Seminar on Secure Images and Image Authentication*, Apr. 2000 (6 pages).

Dittmann, J., et al., "Combining digital watermarks and collusion secure fingerprints for digital images," *Proc. SPIE* 3657:171-182, Jan. 1999.

Epp, L.W., et al., "Generalized scattering matrices for unit cell characterization of grid amplifiers and device de-embedding," *IEEE*, 2:1288-1291, Jun. 1995.

European Search Report dated Apr. 12, 2012 for European Patent Application No. 07836262.1 filed Jul. 25, 2007 (12 pages).

European Search Report dated Nov. 10, 2010 for European Patent Application No. 03774648.4, filed Oct. 7, 2003 (5 pages).

Furon, T., et al., "An asymmetric watermarking method," *IEEE Trans. Signal Processing*, 4(51):981-995, Apr. 2003.

Guth, H.J., et al., "Error-and collusion-secure fingerprinting for digital data," *Proc. 3rd Int. Workshop on Information Hiding*, LNCS 1768:134-145, Sep./Oct. 1999.

Hartung, F., et al., "Digital watermarking of MPEG-2 coded video in the bitstream domain," *Proc. IEEE Int. Conf. on Acoustics, Speech and Signal Processing*, 4:2621-2624, Apr. 1997.

Hartung, F., et al., "Watermarking of MPEG-2 encoded video without decoding and re-coding," *Proc. SPIE Multimedia Computing and Networking 97*, 3020:264-274, Feb. 1997.

Hartung, F., et al., "Watermarking of uncompressed and compressed video," *Signal Processing*, 3(66):283-301, May 1998.

Heegard, C., et al., "On the capacity of computer memory with defects," *IEEE Trans. Info. Theory*, 5(IT-29):731-739, Sep. 1983.

International Search Report and Written Opinion dated Apr. 24, 2012 for International Application No. PCT/US2011/051857, filed Sep. 15, 2011 (9 pages).

International Search Report and Written Opinion dated Aug. 14, 1998 for International Application No. PCT/US1998/009587, filed May 12, 1998(3 pages).

International Search Report and Written Opinion dated Aug. 22, 2007 for International Application No. PCT/US2006/031267, filed Aug. 9, 2006 (2 pages).

International Search Report and Written Opinion dated Feb. 14, 2002 for International Application No. PCT/US2001/026505, filed Aug. 27, 2001 (2 pages).

International Search Report and Written Opinion dated Jan. 4, 2008 for International Application No. PCT/US2006/015615, filed Apr. 25, 2006 (5 pages).

International Search Report and Written Opinion dated Mar. 28, 2012 for International Application No. PCT/US2011/051855, filed Sep. 15, 2011 (8 pages).

International Search Report and Written Opinion dated May 13, 2008 for International Application No. PCT/US2006/025090, filed Jun. 27, 2006 (2 pages).

International Search Report and Written Opinion dated May 19, 2004 for International Application No. PCT/US2003/031816, filed Apr. 29, 2004 (3 pages).

International Search Report and Written Opinion dated May 29, 2008 for International Application No. PCT/US2006/015410, filed Apr. 21, 2006 (6 pages).

International Search Report and Written Opinion dated Sep. 26, 2008 for International Application No. PCT/US2007/016812, filed Jul. 25, 2007 (6 pages).

Jacobsmeyer, J., et al., "Introduction to error-control coding," *Pericle Communications Company*, 2004 (16 pages).

Kalker, T., et al., "A security risk for publicly available watermark detectors," *Proc. Benelux Info. Theory Symp.*, Veldhoven, The Netherlands, May 1998.

Kalker, T., et al., "System issues in digital image and video watermarking for copy protection," *Proc. IEEE Int Conf. on Multimedia Computing and Systems*, pp. 562-567, Jun. 1999.

Kang, X., et al., "A DWT-DFT composite watermarking scheme robust to both affine transform and JPEG compression," IEEE Transactions On Circuits and Systems for Video Technology, 8(13):776-786 Aug. 2003.

Kim, T.Y., et al., "An asymmetric watermarking system with many embedding watermarks corresponding to one detection watermark," *IEEE Signal Processing Letters*, 3(11):375-377, Mar. 2004.

Kirovski, D., et al., "Multimedia content screening using a dual watermarking and fingerprinting system," *Proceedings of the tenth ACM international conference*, pp. 372-381, 2002.

Kirovski, D., et al., "Randomizing the replacement attack," *ICASSP*, pp. 381-384, 2004.

Kirovski, D., et al., "Multimedia content screening using a dual watermarking and fingerprinting system," *Multimedia '02 Proceedings of the tenth ACM international conference on Multimedia*, 2002 (11 pages).

Kocher, P., et al., "Self-Protecting Digital Content: A Technical Report from the CRI Content Security Research Initiative," *Cryptography Research, Inc. (CRI)*, 2002-2003 (14 pages).

Kutter, M., et al., "The watermark copy attack," Proc. of the SPIE: Security and Watermarking of Multimedia Content II, 3971:1-10, Jan. 2000.

Kuznetsov, A.V., et al., "An error correcting scheme for defective memory," *IEEE Trans. Inf. Theory*, 6(4):712-718, Nov. 1978 (7 pages).

Lacy, J., et al., "Intellectual property protection systems and digital watermarking," *Proceedings: Information Hiding, Second International Workshop*, Portland, Oregon, pp. 158-168, 1998.

Lin, E.T., et al., "Detection of image alterations using semi-fragile watermarks," *Proceedings of the SPIE International Conference on Security and Watermarking of Multimedia Contents II*, Jan. 2000 (12 pages).

Lin, P.L., et al., "Robust transparent image watermarking system with spatial mechanisms," *The Journal of Systems and Software*, 50:107-116, Feb. 2000.

Lotspeich, J., "The Advanced Access Content System's Use of Digital Watermarking," MCPS '06, Oct. 28, 2006, pp. 19-21.

Lu, C.S., et al., "Oblivious cocktail watermarking by sparse code shrinkage: A regional-and global-based scheme," *IEEE Transactions on Multimedia*, 4(2):209-224, Dec. 2000.

Maehara, F., et al., "A proposal of multimedial home education terminal system based on flash-squeak OS," *Technical report of the institute of image information and television engineers*, 28(43):21-24, Jul. 2004.

Mason, A. J., et al., "User requirements for watermarking in broadcast applications," *IEEE Conference Publication, International Broadcasting Convention (BC 2000)*, Amsterdam, Sep. 8-12, 2000 (7 pages).

Mintzer, F., et al "If one watermark is good, are more better?," *Acoustics, Speech, and Signal Processing, ICASSP*, 4:2067-2069, Mar. 1999.

Mobasseri, B.G., et al. "Content authentication and tamper detection in digital video," *Image Processing Proceedings, International Conference*, 1:458-461, 2000.

Moulin, P., et al., "Detection-theoretic analysis of desynchronization attacks in watermarking," Technical Report MSR-TR-2002-24, *Microsoft Corporation*, Mar. 2002.

Muranoi, R., et al., "Video retrieval method using shotID for copyright protection systems," *Proc. SPIE Multimedia Storage and Archiving Systems III*, 3527:245-252, Nov. 1998.

Nikolaidis, N., et al., "Watermark detection: benchmarking perspectives," *2002 IEEE Conference on Multimedia and Expo*, 2002 (4 pages).

Office Action dated Mar. 16, 2012 for Japanese Patent Application No. 2008-508985 (17 pages).

Office Action dated Mar. 18, 2011 for European Patent Application No. 03774648.4 (6 pages).

(56) References Cited

OTHER PUBLICATIONS

Office Action dated May 8, 2012 for Japanese Patent Application No. 2009-522802 (4 pages).
Park, J.H., et al., "Robust and fragile watermarking techniques for documents using bidirectional diagonal profiles," *Information and Communications Security: Third International Conference*, Xian, China, Nov. 2001, pp. 483-494.
Perez-Gonzalez, F., et al., "Approaching the capacity limit in image watermarking a perspective on coding techniques for data hiding applications," *Signal Processing*, 6(81):1215-1238 Jun. 2001.
Petitcolas, F., et al., "The blind pattern matching attack on watermark systems," *IEEE Trans. Signal Processing*, Apr. 2003 (4 pages).
Petitcolas, F.A.P., et al "Attacks on copyright marking systems," *Second Workshop on Information Hiding, Lecture Notes in Computer Science*, Portland, Oregon, pp. 218-238, Apr. 1998.
Philips Research Liquid Audio Fraunhofer Institute, "Digital Audio Screening Technology for Phased Rollout," Version 1.00, May 1999 (38 pages).
Pytlak, J.,"Anti-piracy coding," URL: http://www.tele.com/pipermail/tig/2003-November/003842.html; Nov. 2003 (2 pages).
RSA Laboratories, "Frequently asked questions about today's cryptography," Version 4.1, May 2000 (37 pages).
Schneier, B., "Applied cryptography, second edition: protocols, algorithms and source code in C," Oct. 1995 (10 pages).
Shih, F.Y., et al "Combinational, image watermarking in the spatial and frequency domains," *Pattern Recognition*, 36:696-975, May 2002.
Solanki, K., et al., "Robust image-adaptive data hiding: modeling, source coding and channel coding", 41st Allerton Conference on Communications, Control and Computing, Oct. 2003 (10 pages).
Steinebach, M., et al., "StirMark benchmark: audio watermarking attacks," International Conference on Information Technology: Coding and Computing (ITCC 2001), Las Vegas, Nevada, Apr. 2001 (6 pages).
Tanaka, K., et al., "Secret transmission method of character data in motion picture communication," *SPIE Visual Communications and Image Processing '91*, 1605:646-649, 1991.
Tsai, M.J., et al., "Wavelet packet and adaptive spatial transformation of watermark for digital image authentication," *IEEE Image Processing, 2000 International Conference*, 1:450-453, 2000 (4 pages).
Verance Corporation, "Confirmedia," PowerPoint presentation made to National Association of Broadcasters; Apr. 24, 2001 (40 pages).
Xu, C., et al., "Applications of digital watermarking technology in audio signals," *Journal of Audio Eng. Soc.*, 10(47):805-812, Oct. 1999.
Yeung, M. M., et al., "An invisible watermarking technique for image verification," *Image Processing, International Conference Proceedings*, 2:680-683, Oct. 26-29, 1997.
Zhao, J., "A WWW service to embed and prove digital copyright watermarks," *Proc. European Conf. on Multimedia Applications, Services and Techniques (ECMAST'96)*, May 1996 (15 pages).
Zhao, J., "Applying digital watermarking techniques to online multimedia commerce," *Proc. Int. Conf. on Imaging Science, Systems and Applications (CISSA'97)*, Jun./Jul. 1997 (7 pages).
European Search Report dated Jul. 3, 2012 for European Patent Application No. 12150742.0, filed Oct. 7, 2003 (5 pages).
"Civolution's 2nd screen synchronisation solution wins CSI product of the year 2011 award at IBC," IBC Press Release, Hall 2—Stand C30, Sep. 2011 (2 pages).
"Red Bee and Civolution develop companion app for FX UK," http://www.digitaltveurope.net/19981/red-bee-and-civolution-develop-companion-app-for-fx-uk, Jan. 2012 (2 pages).
Bangaleea, R., et al., "Performance improvement of spread spectrum spatial-domain watermarking scheme through diversity and attack characterisation," IEEE Africon, pp. 293-298, 2002.
European Search Report dated Oct. 24, 2012 for European Patent Application No. 06758537.2, filed Apr. 21, 2006 (6 pages).
European Search Report dated Oct. 31, 2012 for European Patent Application No. 06758577.8, filed Apr. 25, 2006 (6 pages).
European Search Report dated Nov. 8, 2012 for European Patent Application No. 06785709.4, filed Jun. 27, 2006 (5 pages).
International Search Report and Written Opinion dated Apr. 8, 2013 for International Application No. PCT/US2012/069306, filed Dec. 12, 2012 (12 pages).
International Search Report and Written Opinion dated Mar. 25, 2013 for International Application No. PCT/US2012/069302, filed Dec. 12, 2012 (22 pages).
International Search Report and Written Opinion dated Feb. 28, 2013 for International Application No. PCT/US2012/066138, filed Nov. 20, 2012 (11 pages).
International Search Report and Written Opinion dated Mar. 14, 2013 for International Application No. PCT/US2012/069308, filed Dec. 12, 2012 (10 pages).
International Search Report and Written Opinion dated Mar. 18, 2013 for International Application No. PCT/US2012/063431, filed Nov. 2, 2012 (10 pages).
Kirovski, D., et al., "Robust spread-spectrum audio watermarking," IEEE International Conference on Acoustics, Speech, and Signal Processing, 3:1345-1348, 2001.
Office Action dated Jul. 21, 2011 for Japanese Patent Application No. 2008-508985 (6 pages).
Office Action dated Nov. 26, 2012 for Japanese Patent Application No. 2011-114667 (8 pages).
Office Action dated May 1, 2013 for Japanese Patent Application No. 2011-114667 (6 pages).
Office Action dated Nov. 28, 2012 for Japanese Patent Application No. 2011-114666 (8 pages).
Office Action dated Jan. 20, 2014 for Japanese Patent Application No. 2013-036990 (6 pages).
Seok, J., et al., "A novel audio watermarking algorithm for copyright protection of digital audio," ETRI Journal, 24(3):181-189, Jun. 2002.
Spangler, T., "Social Science," http://www.multichannel.com/content/social-science, Sep. 2011 (5 pages).
Wang, X., et al., "Robust correlation of encrypted attack traffic through stepping stones by manipulation of interpacket delays," Proceedings of the 10th ACM conference on computer communications security, Oct. 27-30, 2003, Washington D.C., USA.
Wolfgang, R., et al., "Perceptual watermarks for digital images and video," Proceedings of the IEEE, 87(7):1108-1126, Jul. 1999.

\* cited by examiner

MEDIA MONITORING, MANAGEMENT AND INFORMATION SYSTEM

CROSS REFERENCE TO RELATED APPLICATIONS

This application is a continuation application of U.S. patent application Ser. No. 12/784,461, filed May 20, 2010, which is a continuation application of U.S. patent application Ser. No. 10/681,953, filed Oct. 8, 2003, now U.S. Pat. No. 7,788,684, which claims benefit of U.S. Provisional Application No. 60/418,597, filed on Oct. 15, 2002. The entire contents of the before-mentioned patent applications are incorporated by reference as part of the disclosure of this application.

BACKGROUND OF THE INVENTION

The present invention relates generally to systems for monitoring transmissions of media content (such as audio and audiovisual content) in order to obtain independent and objective data regarding the use of specific media content recordings or works within said transmissions. The invention also relates to the processing and reporting of such data in various ways to serve a variety of business needs. More particularly, the invention relates to methods for employing content identification technology to efficiently and automatically obtain reliable, accurate, and precise monitoring data. The invention further relates to methods for producing information products and services based on such monitoring systems.

It is often desired to perform monitoring to obtain information regarding the use of (or the failure to use) particular media content (such as live or prerecorded music, radio and television programming, and advertising) within various types of transmissions (such as radio and television broadcasts, Internet downloads and streams, and public address systems). The commercial reasons for desiring such information are many and varied, including: providing proof-of-performance for paid advertisements, determining compliance with syndication licenses, identifying uses of copyrighted sound recordings within other programming, administration of the performing rights associated with copyrighted musical compositions, determining the audience size of broadcasts, identifying retransmissions of network or syndicated content, identifying corrupted or partial transmission of advertisements or programming, identifying unauthorized transmissions of copyrighted works, and identifying uses of promotional content and public service announcements.

In such monitoring, it may be desirable to obtain a variety of pieces of information regarding the use of the media content, including identification of the exact time, date, location of reception, duration, quality, origin, and method of transmission of the content. In addition, it is advantageous to perform such monitoring automatically without significant intervention from human operators.

There are a number of prior art broadcast monitoring systems, which may generally be classified in two groups: passive and active systems. In passive systems, where no additional signals are added to the broadcast programs, measurements of individualizing innate characteristics of the broadcast signals are used to identify a particular segment. These characteristics are sometimes referred to as "fingerprints" in analogy with human fingerprints that are used to identify individuals. Some examples of fingerprints include spectral variations of the broadcast signals, statistical moments, predefined patterns, such as key words, or predefined signal shapes, etc. Descriptions of passive monitoring and identification systems may be found in U.S. Pat. Nos. 3,919,479; 4,230,990; 4,677,466; 4,697,209; 4,843,562; 5,210,831; 5,436,653; 5,481,294; 5,504,518 and 5,581,658. Such fingerprinting techniques have the disadvantage of requiring complicated search algorithms for comparing the fingerprints that are extracted from broadcast segments to a large database of previously stored fingerprints. In addition, they require a sizeable database of stored fingerprints which only grows in size and complexity as the monitoring service is expanded to include newly produced content.

Active systems modify broadcast signals by introducing (e.g., via "embedding") additional data-carrying signals into the broadcast in a way that does not interfere with normal viewing and/or listening of the broadcast content. However, such additional signals can be detected and decoded (i.e. "extracted") by an appropriately designed device. Active systems may be classified into two categories, usually known as 'out-of-band' and 'in-band' systems.

In out-of-band systems, the additional information does not reside within the frequency, time or spatial content of the broadcast signal. For example, some video monitoring signals use the vertical blanking intervals of a video signal to insert identification codes. Other systems use a carrier signal outside the frequency spectrum of audio signals for carrying the identification information. Examples of such systems are described in U.S. Pat. Nos. 4,686,707; 4,967,273 and 5,425,100. The primary disadvantage of such systems is their vulnerability to format conversion and filtering of the broadcast signals during distribution of the content. For example, data inserted in the vertical blanking intervals (VBI) of an NTSC format video signal may be lost if the video signal is converted from NTSC to MPEG format. Likewise, additional data signals inserted in the audio spectrum outside the range of human hearing may be removed by bandpass filtering of the encoded audio signals.

In contrast, the additional information in an 'in-band' system is inserted within the visible portion of video and/or audible portion of audio content, which is more likely to be preserved during any further duplication, distribution, processing, or broadcast of the content. This type of embedding of auxiliary signals into humanly-perceivable media content is often called "watermarking." Some examples of such watermarking systems include embedding auxiliary information into television broadcasts by changing the luminescence of adjacent horizontal lines of video in opposite directions. In a typical viewing situation, the human visual system would 'average' adjacent horizontal lines and not notice the deviations from the original. Other systems modulate the auxiliary identification information with an independently generated carrier signal using well-known modulation techniques such as AM, FM, PM or spread-spectrum, and then introduce the modulated signal as low level noise into the broadcast segment. Examples of such systems can be found in U.S. Pat. Nos. 3,842,196; 3,885,217; 4,686,707; 4,945,412; 4,969,041; 5,200,822; 5,379,345; 5,404,377; 5,404,160; 5,408,258; 5,425,100; 5,450,490; 5,579,124; 5,581,800 and 6,404,898. These systems can generally be made resilient to a wider variety of transmission channel impairments than their out-of-band counterparts. Extraction of reliable identification information under more severe channel impairments, however, usually necessitates increasing the strength of the embedded watermark. This, in turn, compromises visual and/or audio quality of the broadcast segment. In addition, these systems usually fail to withstand combinations of such unintentional impairments or intentional attacks. A short list of typical transmission channel impairments which may be present in an audio-visual transmission channel include: lossy compression (e.g. MPEG), linear time compression/expansion, pitch-invariant time compression/expansion, Gaussian and non-Gaussian noise, equalization, voice over, change in resolution, change in bit depth, filtering, digital-to-analog and analog-to-digital conversions, interpolation, cropping, rotation, geometrical distortions, dynamic range compression, etc.

While a number of broadcast monitoring systems that have been deployed commercially employ image or video-based watermark technology, there are certain advantages in using audio watermarks for monitoring. For example, it may be less computationally-expensive to process audio information because of its relatively slow data rate (compared to typical video data rates). Of course, the processing requirements strongly depend on the particular technology in use. It is also possible to monitor both audio and audiovisual content through the use of audio watermarking, whereas image or video-based watermarking fails to address the monitoring of exclusively audio content.

SUMMARY OF THE INVENTION

It is a principal object of this invention to provide reliable and comprehensive monitoring methods that overcome various deficiencies of the prior art systems. It is another object of the present invention to provide improved monitoring data through the use of redundant receivers and combined analysis of multiple copies of the same transmitted content. It is also an object of this invention to improve the accuracy or effectiveness of monitoring by measuring the quality of the received transmission or the transmission channel by measuring received transmission channel characteristics such as Signal-to-Noise-Ratio (SNR) or dropped packet rate. It is another object of this invention to differentiate between multiple points of origin of a composite transmission, such as the local, regional and national broadcast segments of a given networked television broadcast or an interstitially inserted advertisement in an Internet stream. It is a further object of the present invention to monitor the use of content in the presence of multiple transmission channel impairments. It should be noted that the term "transmission" as used herein will be understood to encompass, but not be limited to, broadcast programming, including satellite, network and cable television and radio programs, Internet broadcast programs, or any other type of program that is transmitted for reception by an audience. All or parts of such programming segments may reside on tangible storage media such as optical, magnetic, and electronic storage media for the purposes of storage, playback or distribution.

In accordance with the invention, a method is provided for monitoring broadcast multi-media content. Multimedia source content is received, and identification information related to the source content is generated. An audio component of the multimedia source content is imperceptibly and repeatedly embedded with the identification information. A detectability metric is produced by assessing the success of the embedding. The detectability metric is transferred to a central repository together with the identification information. The embedded multimedia content is transmitted through one or more broadcast networks, and received at a receiver. The received multimedia content is processed to extract identification information related to the multimedia content. It is noted that as used herein, the term "imperceptibly" includes "substantially imperceptibly", as it is conceivable that a person with a trained ear or an unusually acute aural sense may be able to perceive some distinction between the audio component prior to and after the identification information is embedded therein.

In an illustrated embodiment, extraction of embedded information is conducted in the presence of multiple transmission channel impairments. The embedding can be repeated in either or both of the temporal domain and frequency domains. Where the repetition is done in the frequency domain, it can occur at different frequencies.

Extraction of multiple copies of embedded information can be used to improve the reliability of multimedia monitoring. For example, extraction of multiple copies of embedded information can be used in accordance with the invention to estimate the duration of multimedia content embedded with identification information.

In one disclosed embodiment, the multiple copies are extracted from the multimedia content received over a single transmission channel. Alternatively, the multiple copies can be extracted from the multimedia content received from a plurality of transmission channels. The multiple copies can, for example, be extracted using a redundant network of receivers. The redundant receivers can be deployed in separate geographical locations.

At least one transmission channel for the embedded multimedia content can be a terrestrial broadcast channel. Alternatively, at least one transmission channel can be an Internet broadcast channel.

The spacing of the extracted copies of embedded information can be used to estimate the boundaries of back-to-back encoded multimedia clips. Moreover, the effectiveness of monitoring can be enhanced by measuring received transmission channel characteristics such as Signal-to-Noise-Ratio (SNR) or dropped packet rate. This technique can provide a measure of the quality of at least one of a received transmission or a transmission channel.

The detectability metric can be used at the monitoring sites to improve the reliability of detection reports. Further, the detectability metric and measured transmission channel characteristics (such as Signal-to-Noise-Ratio (SNR) or dropped packet rate) can be used at the monitoring sites to improve the reliability of multimedia monitoring. It is also disclosed that the identification information may be re-embedded with a modified embedding strength based on the detectability metric.

The type and extent of impairments present in the transmission channel can be identified based on the quality of extracted information from the embedded multimedia content.

The present disclosure also teaches that multiple points of origin of a composite transmission, such as the local, regional and national broadcast segments of a given networked television broadcast or an interstitially inserted advertisement in an Internet stream, are differentiated.

Prior to the transmission of multimedia content, the multimedia content can be examined for the presence of a valid watermark. For example, the validity of an embedded watermark can be ascertained by verifying the embedded identification information against corresponding information residing in a database.

A system is also disclosed for monitoring broadcast multi-media content. Receiving means are provided for receiving multimedia source content. Identification information generating means are used to generate identification information related to the source content. Embedding means imperceptibly and repeatedly embed the audio component of the multimedia source content with the identification information. Watermark assessment means produce a detectability metric by assessing the success of the embedding. Transfer means transfer the detectability metric together with the identification information to a central repository. Transmission means transmit the embedded multimedia content through one or more broadcast networks. Reception means receive the broadcast multimedia content. Processing means process the received multimedia content to extract identification information related to the multimedia content.

These and additional features and advantages of the present invention, such as its novel system architecture, set of services offered, system control and maintenance features, which result in exceptional performance characteristics, will become more readily clear from the following detailed description of the media monitoring, management and information system, together with the accompanying drawings.

DETAILED DESCRIPTION OF THE INVENTION

Figure 1:
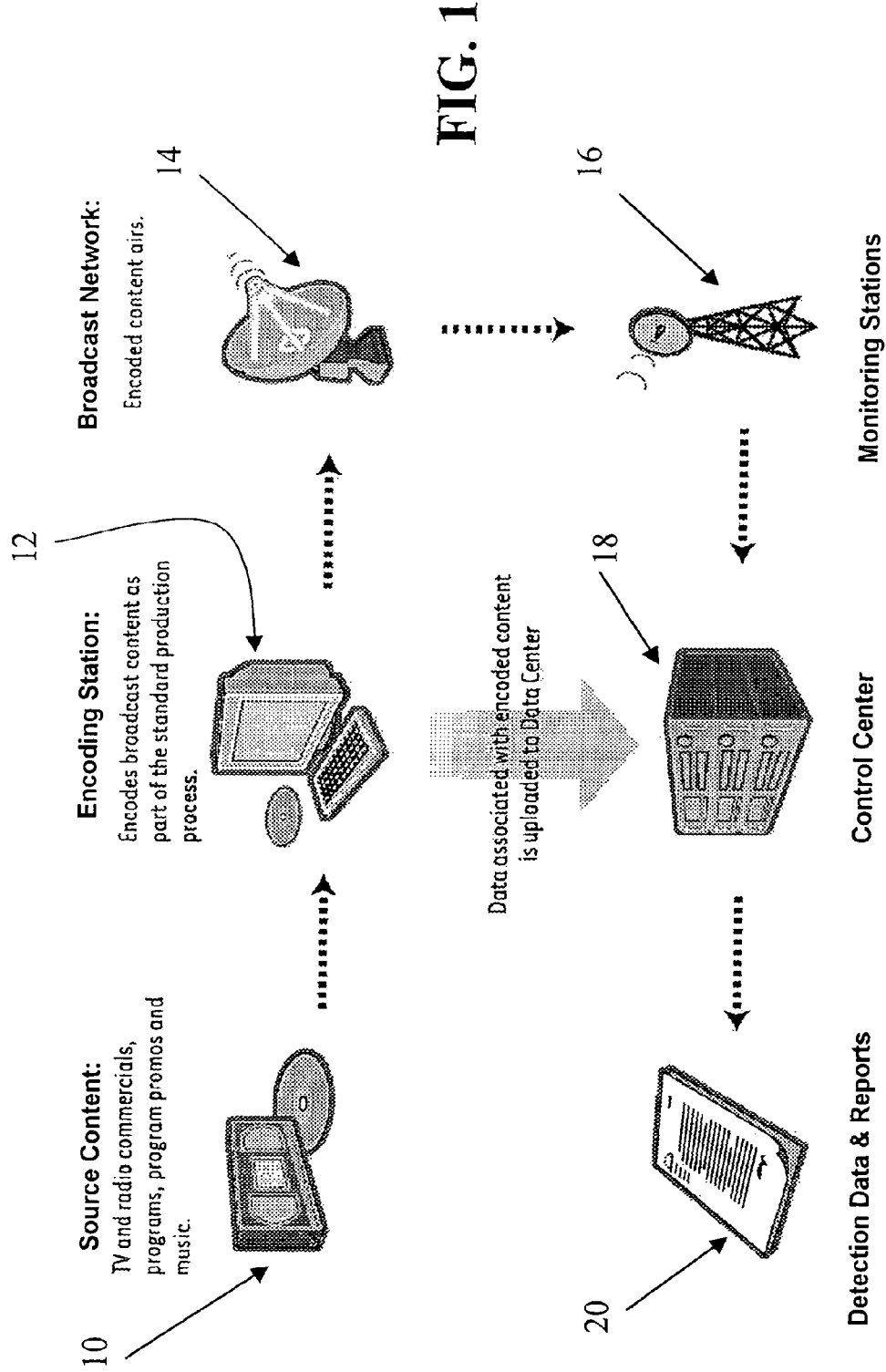
FIG. 1 illustrates a general monitoring network connectivity framework.

FIG. 1 is a high-level diagram of a monitoring system for detecting encoded information carried in a data signal. The source content 10 may comprise, for example, TV and radio commercials, programs, movie and program promos, music which is produced for broadcast, etc. All or parts of such source content 10 may reside on storage devices such as magnetic tapes, hard drives, optical storage or electronic memory devices. Alternatively, the source content 10 may be the soundtrack of a motion picture that is stored on the same medium or separate from the motion picture, e.g., as a digital or analog signal using any of a variety of well-known optical or magnetic techniques. In such cases, means must be provided to extract the associated audio in a computer-readable form for subsequent watermark embedding. It is further possible to directly access the audio signal from the production source without the need for intermediate storage. Such scenarios include direct (acoustical) coupling from the sound source, such as in live musical concerts or theatrical events, or during the studio production via digital and/or streaming networks and apparatus. Delivery means for such source content 10 also includes, but is not limited to, telephone lines, high-speed and/or wireless networks or a simple physical storage medium, as depicted in FIG. 1.

The source signal is digitized, if necessary, and sent to an encoding station 12 for embedding. In FIG. 1, this encoding station 12 is depicted to contain a Personal Computer (PC) as its processing unit. However, the PC may be readily replaced by any other processor capable of carrying out complex mathematical operations. Examples of such processors include, but are not limited to, the following: digital signal processors (DSP's), electronic circuits containing ASIC and FPGA devices, laptop and handheld electronic devices such as Personal Digital Assistants (PDA's) and mobile phones. Clearly, for the purposes of embedding watermarks into source content 10, a software solution may be more economically feasible, but it may be necessary to utilize a hardware implementation in, for example, time-critical audio-visual applications where synchronization between audio and video is required. It is further possible to place an embedding engine directly inside of a sound capturing device such as a movie camera, audio recording device and/or studio sound equipment, thus eliminating the need for a PC embedding device. In such cases, hardware or firmware modifications to the conventional sound capture/processing apparatus will be necessary.

The particular embedding techniques used in the monitoring system can be described under the general terminologies "Feature Modulation" and "Replica Modulation." These techniques, which are one of the differentiating factors of the present invention, transform part of the source signal, i.e. the replica or the feature, into a carrier of multi-bit auxiliary information that is subsequently added to the broadcast signal using psycho-acoustical masking considerations. The source signal embedded this way does not contain audible artifacts that can be discerned by ordinary or even highly trained human listeners; yet, the embedded information can be successfully extracted with accuracy rates of close to 100%, even in the presence of extreme intentional and unintentional transmission channel impairments and attacks. Using these algorithms, watermarks are inserted simultaneously and redundantly in separate frequency bands in order to withstand different types of distortion, such as noise addition, time scaling, reverberation etc. Because these watermarks reside in separate frequency bands, their audible artifacts are not cumulative; i.e. if the watermark in each band is transparent to the listener, then combining these bands together will not produce audible artifacts. This feat is accomplished through numerous subjective tests and is consistent with the well-known feature of the human auditory system in which different spectral bands are detected with different receptors (hair cells inside cochlea). The exceptional robustness of the watermark is further complimented by several levels of error correction techniques. The details of the embedding algorithms are disclosed in commonly owned U.S. Pat. Nos. 5,940,135; 6,175,627; and 6,427,012. Another feature of the embedding technique in the system of the present invention is its security against intentional attacks that attempt to remove or obliterate the embedded watermark; the detailed disclosure of this feature is given in commonly owned U.S. Pat. No. 6,145,081.

During the embedding process, a multi-bit ID field is encoded in the source content 10 and, as shown in FIG. 1, the 'metadata' associated with the encoded content is transferred to the Control Center 18 upon each successful embedding. This metadata may comprise a full description of the owner and content, date and time stamps, etc. that are used to facilitate the identification and tracking of broadcast signals once the embedded content is received by the monitoring stations 16. It is also possible for the embedded watermark to carry all the pertinent information required for tracking and identification of the broadcast segment. However this would require a large watermark payload capacity which necessitates either longer embedded segments or a lower expected detection reliability. For example, a 3-minute music track may be a suitable candidate for this type of embedding but a 20-second commercial may not qualify due to its short duration. The connection between the encoding stations 12 and the Control Center 18 may be any high-speed or low-speed network connection such as telephone lines or cable networks. This transfer of information may also take place either immediately after encoding or after a delay. To illustrate this point by way of example only, and not by way of limitation, one may consider saving the metadata for one or more encodings onto a storage medium, such as a magnetic or optical disk, and subsequently sending the metadata to the Control Center 18 via email or postal delivery at a later time.

The embedded content is then sent to the broadcast network 14 for distribution to the general public and/or paying customers. In FIG. 1, a satellite broadcast example is depicted. It will be appreciated by those skilled in the art that other means of signal distribution can readily replace and/or compliment the terrestrial broadcast model. Such distribution channels include, but are not limited to, cable television distribution networks, telephone-lines, DSL and broadband networks that power the Internet and local storage devices and server farms.

At the reception sites, monitoring stations 16 continually monitor the airwaves in search of encoded content. These monitoring stations 16 may be spread throughout different geographical locations within the United States or throughout the world, monitoring a variety of AM and FM radio stations as well as Cable and Network television broadcasts. Other broadcast systems such as short-wave radio, satellite radio, local cable and Internet systems may also be monitored by including the appropriate receivers/decoders at the monitoring sites. These sites are chosen to allow simultaneous monitoring of a large number of radio and TV broadcast signals with good quality of reception. This is accomplished by using computer simulations of RF propagation in conjunction with databases of 'digital terrain' and FCC approved antenna locations, heights and broadcast powers, for finding optimum locations for the monitoring antennas. Such elaborate analysis is not required for other broadcast systems such as digital satellite broadcasts, web 'streaming' broadcasts, and local cable TV networks, where access convenience and cost are among major factors.

The Control Center 18 is an integral part of the overall monitoring system, interacting with both the embedding and detection branches. Generating detection and data reports 20, issuing embedding and distribution authorizations and discerning false detection alarms are among tasks performed at the Control Center 18. The connectivity of the Control Center 18 to the outside world is established through a variety of low- and high-speed network connections as well as operator interaction. Data and commands may also be carried via tangible storage media such as optical and magnetic disks. These and other functionalities of the Control Center 18 will be described shortly herein.

Figure 2:
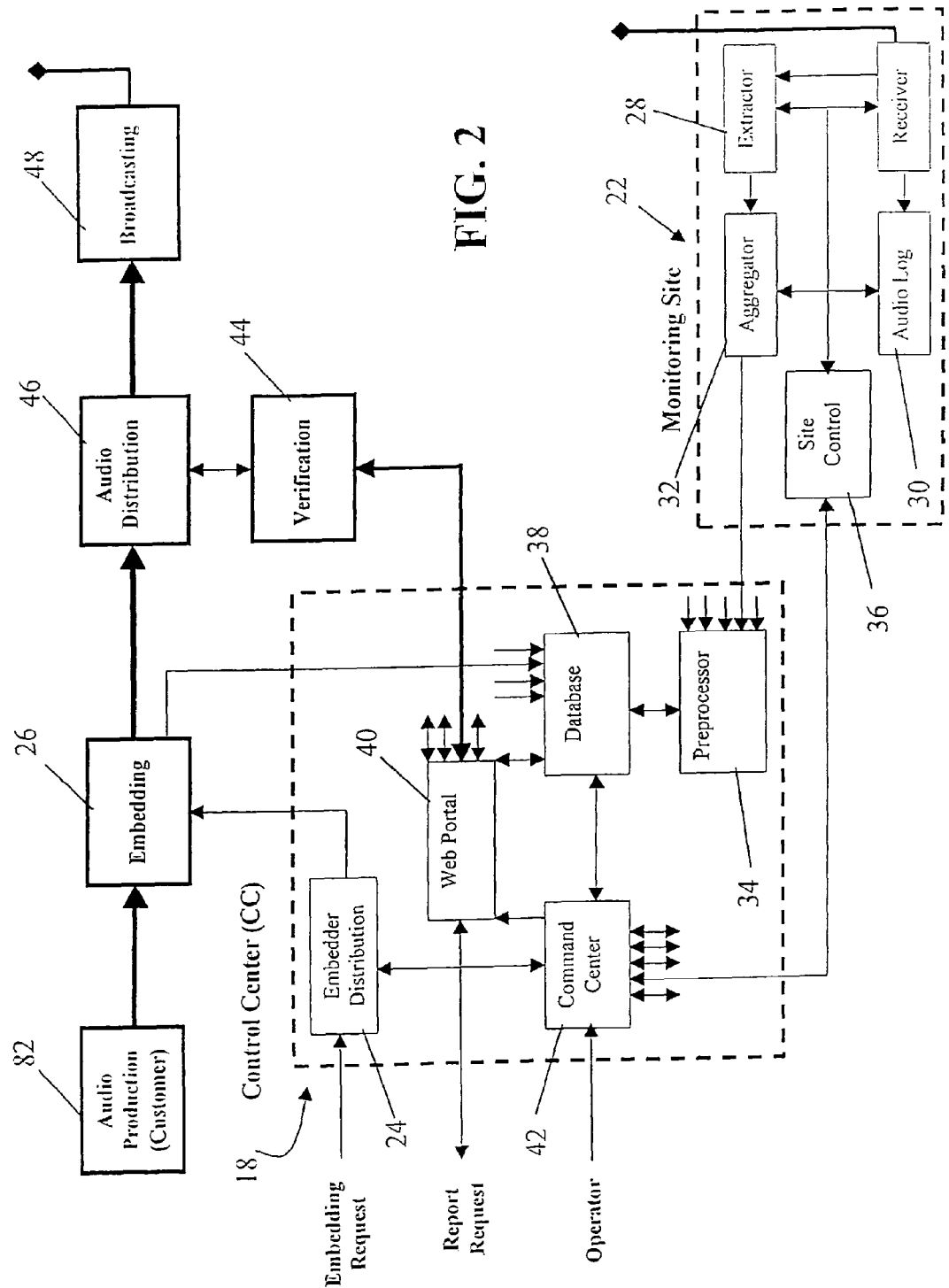
FIG. 2 is detailed block diagram of a preferred embodiment of the monitoring system.

FIG. 2 is a block diagram of a preferred embodiment of the present invention. Two dashed-line rectangles contain two major components of the system: Control Center (CC) 18 and Monitoring Site 22, which is sometimes also referred to as EAR (Event Airplay Receiver). There are many EARs that are connected to the Control Center 18 using a circuit-oriented TCP/IP Wide Area Network (e.g., virtual circuits over a frame relay cloud). This connectivity may also be realized with a variety of other topologies and techniques such as using Virtual Private Networks (VPNs) or point-to-point connections. Data communication between EARs and the Control Center 18 is done through secure protocols to ensure integrity of all reports and prevent unauthorized access. Preferably, the individual EARs are situated on the premises of independent contractors and out of the control of broadcasters, to further reduce any possibility of signal tampering. The system of FIG. 2 is capable of monitoring broadcast signals at the national, regional and/or local distribution levels. This way, the monitoring system can tap onto broadcast signals in the same way as ordinary listeners/viewers, and can detect whatever goes to the ordinary public, including broadcast interruptions, cropping of the clips, voice-overs, etc.

Figure 3:
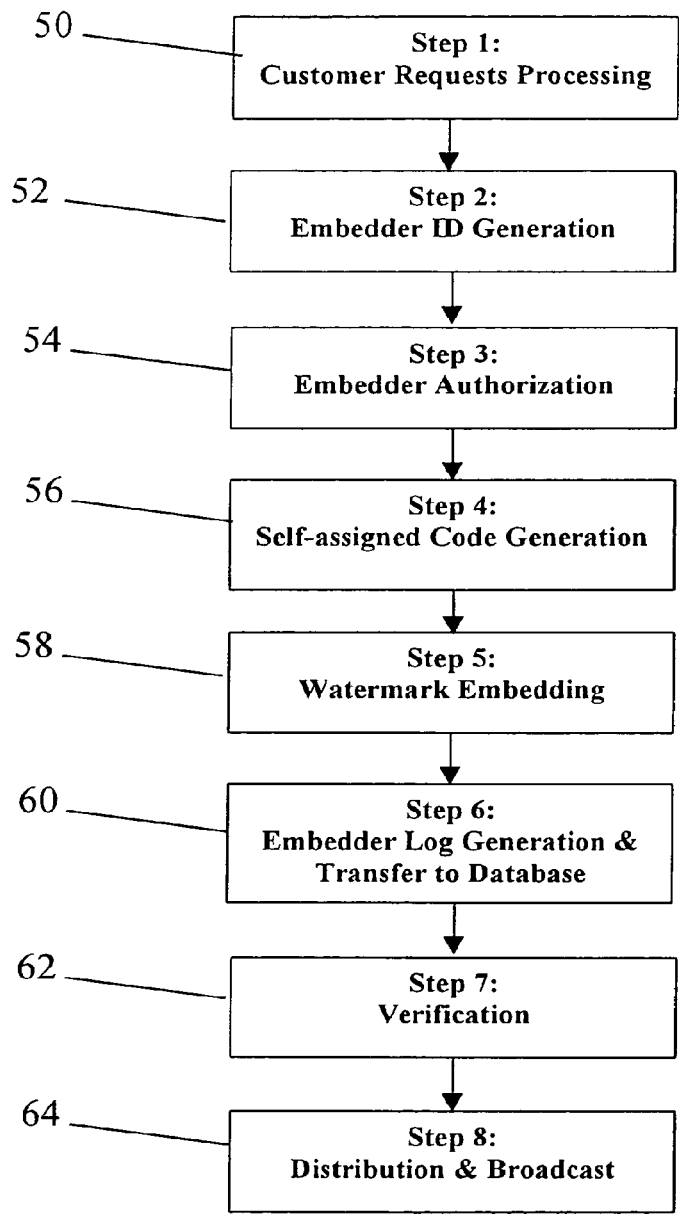
FIG. 3 is a step by step description of an encoding process in accordance with the invention.

FIG. 2 includes a number of related blocks that enable encoding of the audio source material in accordance with the steps outlined in FIG. 3. In step 1, Customer Request Processing 50, customer requests are processed which typically include customer identification documents, type of embedder required, reasons for embedding, etc. This communication may take place through sales personnel, but an automatic system for processing customer requests is preferable. In step 2, Embedder ID Generation 52, an identification code is generated which uniquely identifies the customer and the matching embedder. This Embedder ID code, which becomes part of the embedded watermark, can be used during detection to automatically identify the customer as well as the matching embedder. In step 3, Embedder Authorization 54, embedder authorization is issued to the customer. Referring to FIG. 2, steps 1 through 3 are all done in the box labeled Embedder Distribution 24. Other variations of the embedder authorization process are also possible. For example, if the embedders are in the form of software modules, they may not be authorized to operate immediately upon installation. In this case, certain key parameters of the platform (e.g. serial numbers of key hardware components) must be read and communicated to the embedder distribution module 24 before embedding authorization is issued for that particular platform. This way, proliferation of embedders and generation of duplicate codes for multiple audio pieces are prevented.

In step 4, Self-assigned Code Generation 56, a "self-assigned" code is automatically generated by the embedder, without user intervention or notification, identifying the particular audio content. In step 5, Watermark Embedding 58, the actual embedding of the watermark takes place and upon successful completion, in step 6, Embedder Log Generation and Transfer to Database 60, the Embedder ID, the self-assigned code and other embedder data are combined to form what is known as an "embedder log", which is transferred to the database 38 which resides within the Control Center 18. It is important to note that the embedder log contains embedder generated data, such as description of the audio content in terms of duration, sampling rate, number of channels, energy profile, etc., and user entered data describing the audio or audio visual watermarked content, i.e., title, owner, industry codes etc. Referring to FIG. 2, steps 4 through 6 are performed in the box labeled Embedding 26. In step 7, Verification 62, which may occur at a much later time, the embedded content is checked for the presence of a valid watermark before being distributed for broadcast in step 8, Distribution and Broadcast 64. In FIG. 2, the Verification 44, Audio Distribution 46 and Broadcasting 48 modules are used to carry out the procedures outlined in steps 7 and 8 above.

Figure 4:
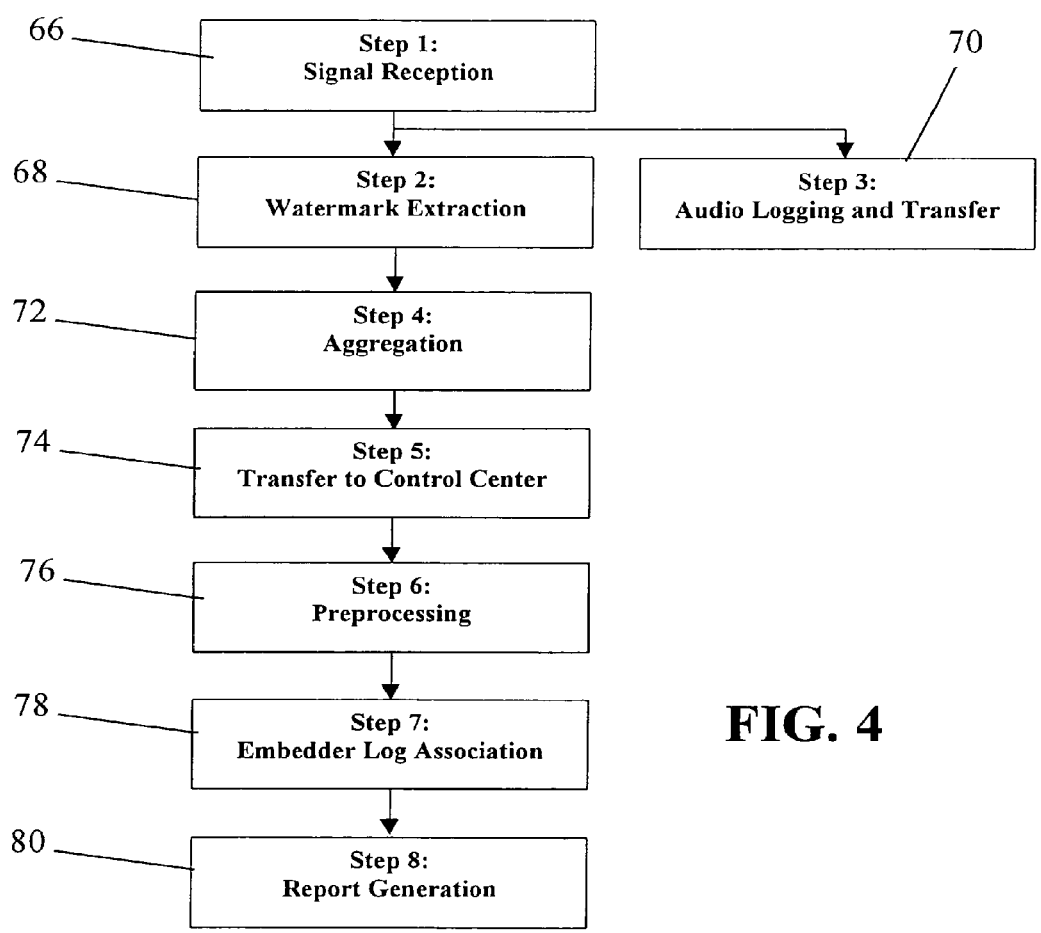
FIG. 4 is a step by step description of an extraction process in accordance with the invention.

FIG. 4 illustrates the steps required for the detection of embedded content in accordance with the preferred embodiment of FIG. 2. In step 1, Signal Reception 66, broadcast signals are received by the EARs; each monitoring site 22 is used to monitor multiple broadcasts, typically between 8 and 80 stations. Appropriate receivers are used to extract audio streams from different types of broadcast signals. For example, AM and FM receivers are utilized to receive AM and FM radio broadcasts, respectively. However, for receiving an audio signal from a TV broadcast, or an analog local cable, it suffices to simply use an FM receiver tuned to the audio carrier of TV broadcasts. In step 2, Watermark Extraction 68, the audio outputs of the receivers are examined by the extractor 28 module of FIG. 2 in order to determine whether or not they contain an embedded watermark. Since it is possible for the same content to contain different types (i.e., layers) of watermarks, the extractor 28 should be equipped to search for and report the data contained within the detected watermarks as well as the type of detected watermark. It is noted that different types of watermarks may be embedded in different content such as music, commercials, and programs. It is also possible to embed different types of watermarks in the same content, but for different purposes such as identifying the content, source, distribution path, or for copy control, etc.

In step 3, Audio Logging and Transfer 70, of FIG. 4, audio output from the receiver is compressed, using any one of the well-known audio compression techniques in the art, and saved in chunks of predefined duration with a date/time stamp. This step is performed in the Audio Log 30 module at the monitoring site 22. The stored audio logs may be retrieved by the Control Center 18 on a regular basis or in response to commands issued by the Control Center 18. The main purpose of the audio logs is to resolve disputes over discrepancies between broadcast monitoring reports and broadcaster logs. In principle, the audio logs may also be used to resolve disputes when the system erroneously detects a watermark in an un-encoded audio clip, i.e., a false detection. However, these cases are much less likely, because well-designed watermarks in the present system have very low probability of false detections. Besides dispute resolution, audio logs are useful for troubleshooting in the case of outages occurring in the broadcast system or the monitoring sites 22. Similarly, audio logs can be used to further analyze anomalous detection results, for example, detections that are short, fragmented, time-compressed, etc. While the stored audio logs are compressed in order to save storage space and transmission bandwidth, it is entirely possible to produce audio logs that are of the original broadcast quality by using less aggressive or even lossless audio compression techniques. Compression factors, and thus the audio log quality, may be changed at different monitoring sites 22 via simple commands from the Control Center 18.

As noted earlier, the same code is embedded simultaneously in multiple frequency bands and repeated many times throughout the audio clip. As a result, there are numerous watermark detections from the same audio clip. In step 4, aggregation 72 of FIG. 4, these detections are organized and combined together by the Aggregator 32 module of FIG. 2. This module is responsible for identifying all watermarks that belong to the same clip, i.e., all watermarks with identical values, and combining them together. In doing so, the preprocessor 34 may also analyze the spacing between neighboring watermarks; if the watermarks belong to the same clip they have a predefined spacing, also known as the heartbeat of the watermark. This analysis is helpful when the same clip is broadcast in a back-to-back fashion; in such cases there is a high likelihood of discontinuity in the heartbeat, which can be used for separating the neighboring clips. An aggregated string of watermarks contains the detected (common) code, start time of the first detected watermark in the string, and end time of the last detected watermark in the string. In the case of delay sensitive applications, the aggregator 32 may immediately report the first detection of a watermark in a new audio clip. It should be noted that digital equipment at the monitoring sites 22 can measure time precisely using their internal crystal based clocks. However, these clocks have precision tolerances, and drift in time. In order to compensate for the clock drift, they are periodically synchronized to a common (atomic) clock over communication lines from the Control Center 18, through a Site Control module 36.

In step 5, Transfer to Control Center 74 of FIG. 4, the aggregator module 32 sends the detection results as well as the ID of the receiver and the broadcast station frequency to the Control Center 18. This information is instrumental in identifying the source of broadcast that carries the extracted codes. The transfer of information to the Control Center 18 occurs in real-time in most cases, and a copy of the detection logs is stored locally for future reference. While FIG. 2 indicates separate links for the aggregator-to-preprocessor and the Site Control-to-Command Center modules, it is entirely possible to utilize a single link for both communication paths.

In step 6, Preprocessing 76 of FIG. 4, aggregated watermark detections, called 'arrivals', are preprocessed by the preprocessor module 34 of FIG. 2. The main task here is to convert the arrivals from multiple aggregators into 'events' by using the information contained in the database 38. The preprocessor module 34 may be called to task at several other occasions, as well. For example, in cases where multiple receivers are tuned to the same broadcast station, all arrivals are converted into a single event by the preprocessor module 34. In some cases, the aggregator 32 may not have been able to merge disjoint watermarks, either because of large gaps between the detections or due to processing delays; the preprocessor module 34 can use the information contained in the database 38 to merge those arrivals. In other cases, the same clip may be consecutively broadcasted two or more times in such a way that it is erroneously identified as one long clip. In such cases, the preprocessor module 34, receiving an arrival with longer than expected duration, may perform 'reverse aggregation' and split a single arrival into two or more events. The preprocessor module 34 also contains several algorithms specific to each type of content. Therefore, the arrivals can be processed differently depending on the a priori information stored in the database 38 about the content and detection information.

In step 7, Embedder Log Association 78 of FIG. 4, all events generated by the preprocessor module 34 are transferred to the database 38 where they are associated with the matching embedder logs. Successful matches are saved in a report folder for future report generation. While a large majority of the matches are successful, there are a few instances where proper matching and identification of the events may not occur. For example, in some cases Embedder IDs may not match any of the issued Embedder IDs in the database 38. These events are stored in a 'false detections' folder for the purpose of statistical analysis. In other cases, the Embedder ID may be recognized, but the self-assigned code may not match anything in the embedder logs. These events are saved in an 'orphans' folder and are re-tested at a later time (e.g., when new embedder log files are uploaded). Finally, if all attempts in recognizing an orphan detection fail, technical support personnel may contact registered users to resolve inconsistencies.

In step 8, Report Generation 80, of FIG. 4, customer reports are generated using the appropriate folders in the database. Reports may be generated upon customer request, or at predefined periodic intervals. FIG. 2 indicates that reports are delivered through the Control Center's web portal 40, but it is certainly possible to deliver them by other means, such as email, hard copy, etc. The Command Center 42 governs who has the rights to obtain reports as well as the format and the type of data in the reports. The report generation step 80 also includes formatting and customizing the final report according to the customer specifications. This allows seamless integration of the detection reports into the customer's workflow. Formatting and integration of the final report may be done internally at the Control Center 18 or performed through third party 'middleware' development (not shown in FIG. 2).

Alternative Architectures

According to a preferred embodiment of the present invention, components in FIG. 2 not contained within the dashed boxes are outside the physical control of the Control Center 18. For example, watermark embedding 26 is done outside of the Control Center 18, typically at customer premises. This is done in order to avoid transfer of audio content from the customer to Control Center 18 and back. Aside from confidentiality concerns over transport of pre-broadcast material to remote locations, the architecture of FIG. 2 avoids any possible delays in the production process due to network and workflow congestion at the Control Center 18. This architecture further simplifies the collection and storage of metadata associated with particular contents. Additionally, some cost savings are realized by avoiding the need for a high-speed connection between the customers and the Control Center 18.

There are also several disadvantages with the embedding architecture of FIG. 2. Particularly, more sophisticated embedder designs are required to maintain proper operation on different computer platforms such as PC, Macintosh, Unix and Linux at customer sites. It also becomes necessary to keep track of the status and the number of distributed embedders. Significant software and/or hardware development efforts must also be undertaken to ensure user-friendliness of the embedding tools in order to avoid embedding mistakes such as a mix-up between original and embedded files, improper embedder installation, wrong selection of embedder options, and embedding the same content multiple times. This also places more demand on customer service efforts for delivering periodic software/hardware upgrades and assisting customers. Complications may also arise if the network connection between the customer and the Control Center 18 is severed and the embedded content is aired without proper transfer of metadata to the Control Center 18. In such cases, the monitoring sites 22 may produce orphan detections that are not readily identifiable. Distributing of the embedding software to the customers may also open the possibility for unauthorized usages of embedding technology and reverse engineering.

Figure 5:
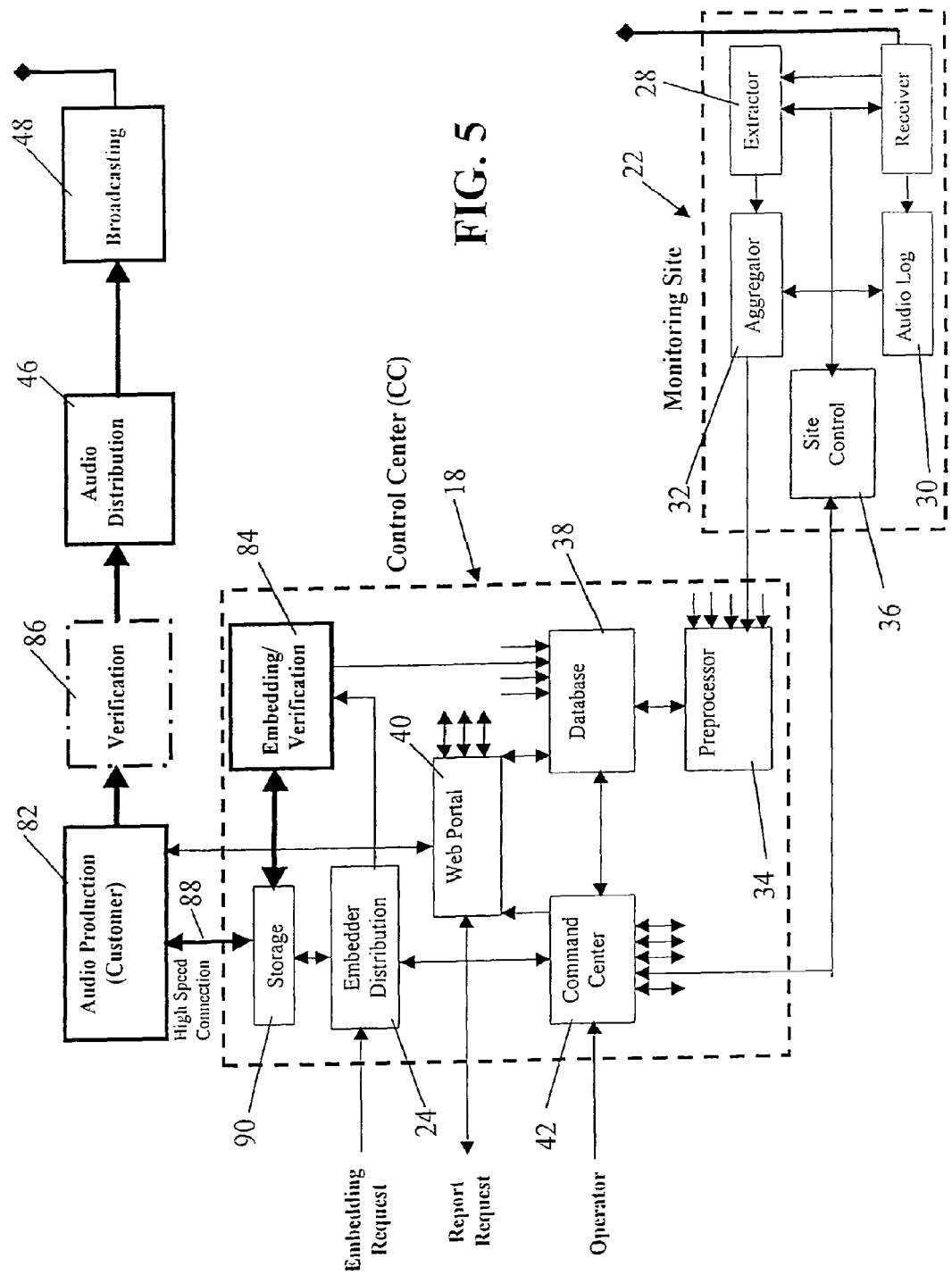
FIG. 5 illustrates a first alternate embodiment of the system of FIG. 2.

In the alternate embodiment of FIG. 5, the above and other disadvantages of the system are overcome by moving the embedding operation entirely into the Control Center 18. In the embodiment of FIG. 5 only one customer 82 is shown, but it is understood that the same architecture allows interaction with multiple customers. According to this architecture, verification and embedding operations are all done in one step, in the Embedding/Verification module 84 of FIG. 5, at the Control Center 18. The customers, however, may decide to optionally verify their content before distribution in order to avoid distribution of un-encoded material. In FIG. 5, this optional verification 86 is shown as a box with dot-dashed borders. Although it is entirely possible to utilize a portable storage medium for the transport of data between the customers 82 and the Control Center 18, the alternate embodiment of FIG. 5 indicates a high-speed connection 88 for data transfer purposes. It also requires additional storage 88 and/or buffering of incoming audio as well as the encoded content at the Control Center 18. Security concerns may also necessitate encryption of the stored audio data and presence of secure internal and external connections. Other concerns regarding the embodiment of FIG. 5 include the amount of work required to generate, enter and collect the related metadata for each and every content by the personnel at the Control Center 18. Improvements in workflow efficiency may be possible by requiring all customers to adhere to a standard information-sharing format and/or directly accessing existing databases at customer sites in order to automatically download portions of the metadata.

Figure 6:
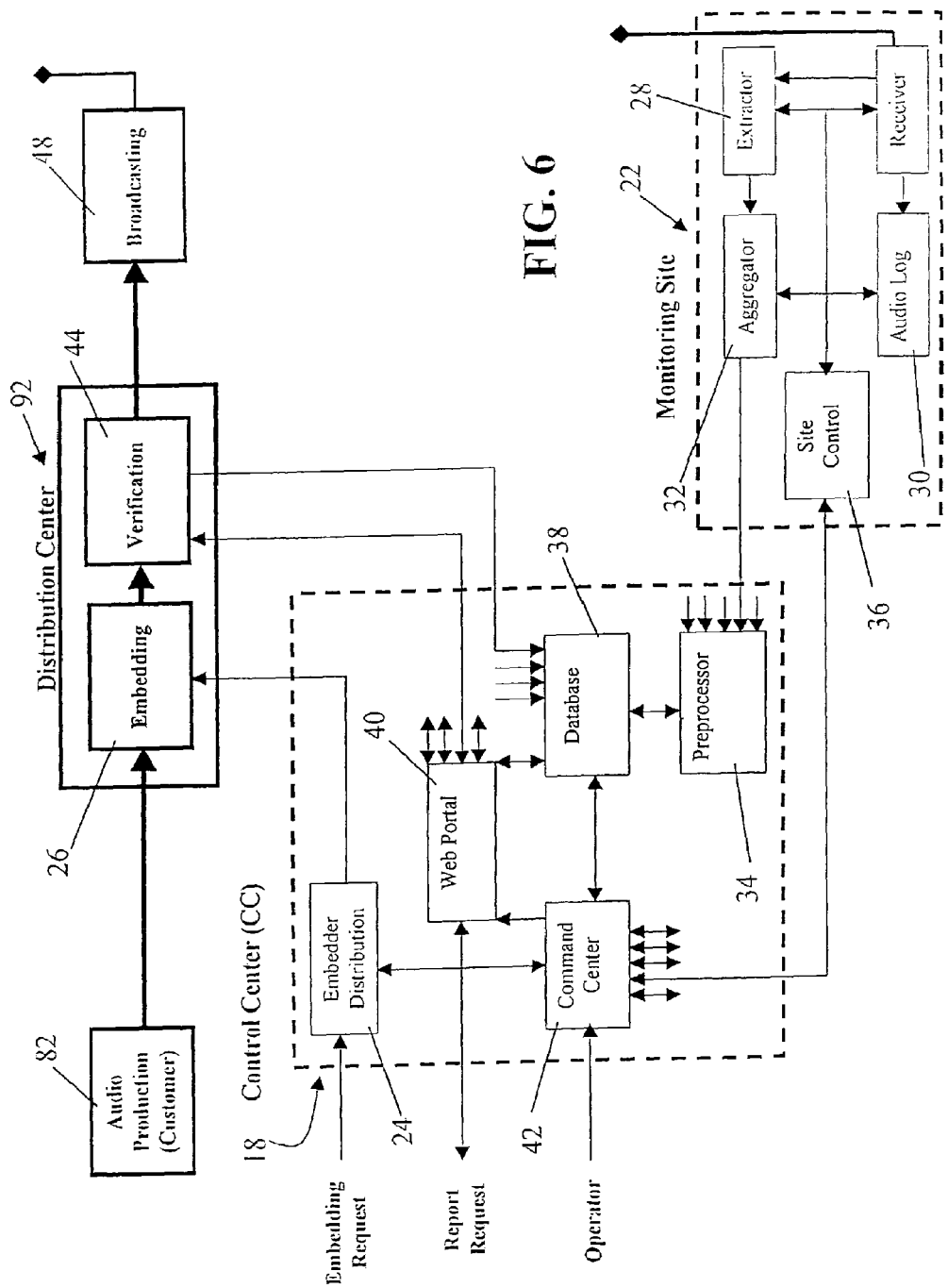
FIG. 6 illustrates a second alternate embodiment of the system of FIG. 2.

FIG. 6 illustrates another alternate embodiment of the present invention, overcoming some of the workflow, security and cost issues associated with the embodiments of FIG. 2 and FIG. 5. According to the architecture of FIG. 6, customers 82 directly send their audio and/or audio-visual content to the distribution center 92 where embedding 26 and verification 44 of content takes place. This architecture avoids the cost and security concerns of a high-speed data connection between individual customers 82 and the Control Center 18. In addition, most of the metadata-related work will be shifted to the distribution center 92 where similar tasks are usually performed for distribution and billing purposes regardless of whether or not watermark insertion is taking place.

Figure 7:
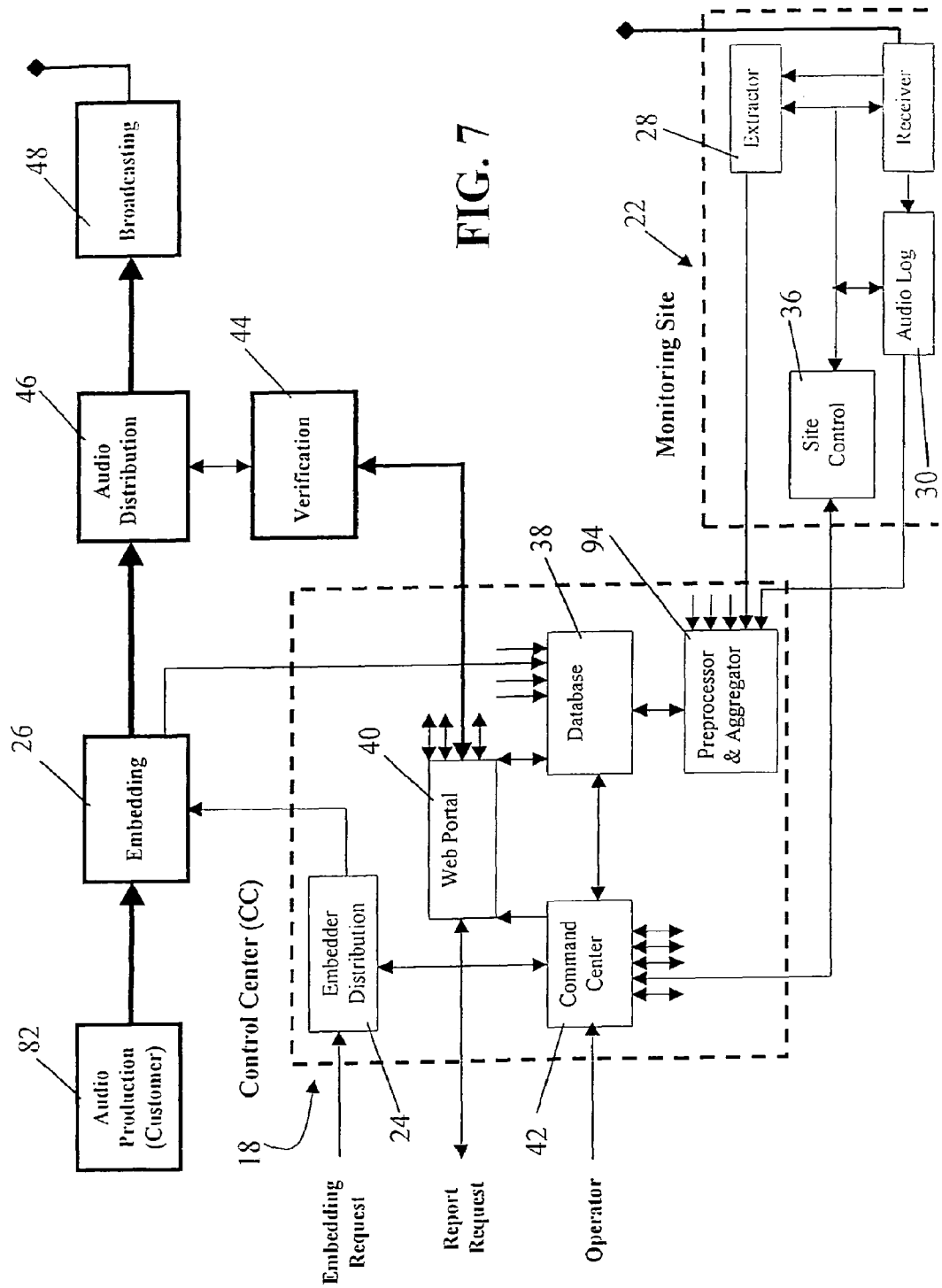
FIG. 7 illustrates a third alternate embodiment of the system of FIG. 2.

FIG. 7 shows yet another embodiment of the present invention. It was previously disclosed in FIGS. 2, 5 and 6 that each monitoring site contains an aggregator module 32. In FIG. 7, this module has been moved into the Control Center 18 to form a combined preprocessor and aggregator module 94. This way, detections from the extractor 28 are directly sent to the preprocessor and aggregator unit 94 at the Control Center 18 where sophisticated aggregation computations are performed using all available resources at the Control Center 18. In addition, fewer control commands are required to regulate the operation of each monitoring site 22. From an economics point of view, it is also advantageous to simplify the design of monitoring sites 22 by eliminating as many components as possible in order to help proliferation and maintenance of the sites, granted that the cost of transferring more detection data may not become prohibitive.

While different embodiments for the embedding, delivery and monitoring of audio content have been disclosed, it should be appreciated that various combinations of the above architectures may be used to effect suitable embedding and monitoring of different types of audio-visual content. For example, while one architecture may be used to deliver production (non-feature) music, another architecture may be used for feature music and yet another architecture may be used for TV or radio advertisements and promotions. Furthermore, while some monitoring sites may contain several sophisticated processing and storage components, others, being located in less accessible locations, for example, may contain only a few components that convey the data for further processing to the Control Center. The complexity of a monitoring site facility may also be influenced by the number and the type of channels being monitored.

Additional Features

As previously disclosed, the Site Control module 36 is used to pass commands and extract status reports from the monitoring sites 22. They are also instrumental in providing accurate timing information for aggregators and extractors and handling requests for on-demand uploading of the audio logs. However, there are many more important functions and features achieved through the communication link between the Site Control 36 and the Control Center 18. One of features is the capability to upgrade various software components that reside within the monitoring site 22. This may include a full replacement of previous software modules or just selection and/or modification of configurable parameters. For example, the monitoring site 22 may be remotely configured to detect additional types of watermarks, e.g., additional watermark layers, or to modify the parameters that are used in detection of a particular watermark layer. It is also possible to remotely switch to spare receivers in case of receiver failures, increase or decrease the number of stations being monitored, adjust certain parameters such as carrier frequency, modulation type, volume, RF attenuation, etc. Similarly, 'first packet reporting', described earlier, may be enabled or disabled in the aggregator.

The Site Control module 36 is also responsible for monitoring the overall status of the monitoring site 22 and communicating the alarm signals to the Control Center 18. These alarm signals are generated by different mechanisms, indicating the status of software, environmental and communication subsystems. For example, temperature and humidity within the monitoring sites 22 are constantly monitored and alarms are generated if they go beyond certain thresholds. Status of internal communications within the monitoring site is also periodically checked for outages and anomalies. Uninterruptible Power Supply (UPS) units may also generate alarms in order to initiate a graceful shutdown of the site. Several other alarms are also generated to assess the quality of the received audio signals. For example, at each monitoring site 22, the RF power of the incoming broadcast signal is continually measured to ensure that it is within acceptable bounds. Similarly audio levels are monitored to make certain they are within a predefined range of values. These measurements provide valuable information regarding the quality of the audio signal which may be used to predict watermark detection reliability.

Signal-to-Noise-Ratio

A standard measure of signal quality is Signal-to-Noise-Ratio (SNR). Monitoring sites 22 are capable of measuring the SNR for all incoming audio signals at the signal reception sites. One method of monitoring SNR is to compare the long-term average of audio signal power with the short-term minimum audio power. Long-term average represents a measure of signal plus noise power. Short-term power calculations, measured over several tens of milliseconds, typically represent intervals where there is no signal present, thus comprising of only noise power. So, SNR can be simply calculated from the following equation:

$$SNR=(\text{Long term power}-\text{minimum short term power})/(\text{minimum short term power})$$

The above technique for calculating SNR was given by way of example and not by way of limitation. Other SNR calculation techniques may be utilized where appropriate. For example, a different method may be applied if a pilot signal used for demodulation is included in the broadcast. This is the case for FM radio and TV broadcasts, where pilot signals are inserted at 19 KHz and 15.75 KHz, respectively. In such broadcasting techniques, the natural audio components around the pilot frequency are removed prior to broadcast. Accordingly, any signal that is detected in the received audio in the vicinity of the pilot signal can be safely attributed to channel noise. In this case, the method of estimating the SNR is based on comparing the signal power in the vicinity of the pilots with the overall power level of received audio.

Using the calculated SNR values, it is possible to continually monitor and log the quality of different audio stations. Alarms generated based on SNR anomalies, in addition to other alarms generated due to, for example, variations in mean signal RF and volume levels, may be used to prompt the Control Center personnel to take appropriate actions. These alarms could be the result of monitoring site equipment failures, broadcast interruptions or poor quality of broadcast signals. In the monitoring system of the present invention, all monitored broadcast channels are periodically assessed in a process known as "channel grooming." The results can be used to predict and improve the watermark detection success rates. In addition, the channel quality information for each geographical location may be shared with the customers and broadcasters. Broadcasters may use this information, for example, to boost their transmission power at certain locations and/or during certain time periods.

Watermark Verification

Embedded audio watermarks in the present invention are substantially inaudible; it is virtually impossible to discern whether or not an audio clip contains a watermark by just listening to it. It is thus essential to systematically verify the presence of a watermark before embedding and before distributing the content for broadcast. As described previously in relation to various embodiments of the present monitoring system, verification may be performed at different points in the encoding chain. For example, it is important to determine whether or not an audio segment already contains a watermark before attempting to re-embed the content. This task can be accomplished with an "integrated extractor" as part of the embedding engine. This way, embedding may be aborted or interrupted if a watermark is detected. In a basic configuration, it suffices to signal the presence or absence of a watermark by an appropriate display or a flag while identifying the clip by just listening to the content. In more sophisticated applications, however, such as automatic inventory of audio clips, it is necessary to convey the metadata related to the watermark back to the Control Center 18. The database inquiries can also clarify the status of a watermark. Some of the detected watermarks may be attributed to test trials conducted at the customer sites or simple mislabeling of the content. In such cases, the Control Center 18 has either no information about the detected watermark or it correctly identifies the customer as the rightful owner of the audio segment.

Other detections may be due to presence of additional watermarks within the content. As previously disclosed, several watermark layers may be inserted into the same audio content for different purposes. By reporting all detections to the Control Center 18, one can track all embedded content, even those embedded previously by a different content owner. This way, for example, the rightful owner of a music piece would be able to collect royalties if his/her music were used in a TV commercial. Detection of different watermark layers is possible at other points within the disclosed monitoring system, as well. For example, as will be described shortly, it may be done at the Verification stage that follows embedding, or it may be done at the monitoring sites after receiving the broadcast signal. This is possible since embedding of one watermark layer over another does not usually obliterate either layer. However, one or more of the layers may be weakened. Furthermore, in the presence of transmission channel noise accompanying broadcast signals, it may be more difficult to reliably detect the presence of older watermarks at the monitoring sites. In such cases, the information residing at the database can be used to verify the existence of all watermarks.

It is also important to verify the presence of a valid watermark before the audio segment is distributed for broadcast. This is done by the block labeled 'Verification' 44 in FIG. 2. The functionality of the verifier is very similar to the integrated extractor, described above, as it searches through the audio segment to detect and report the presence of all embedded watermarks. In a stand-alone configuration, the presence or absence of a watermark may be signaled using an appropriate display or a flag. In a verification scheme with connectivity, the detected watermarks are reported back to the Control Center 18 and checked for validity.

Figure 8:
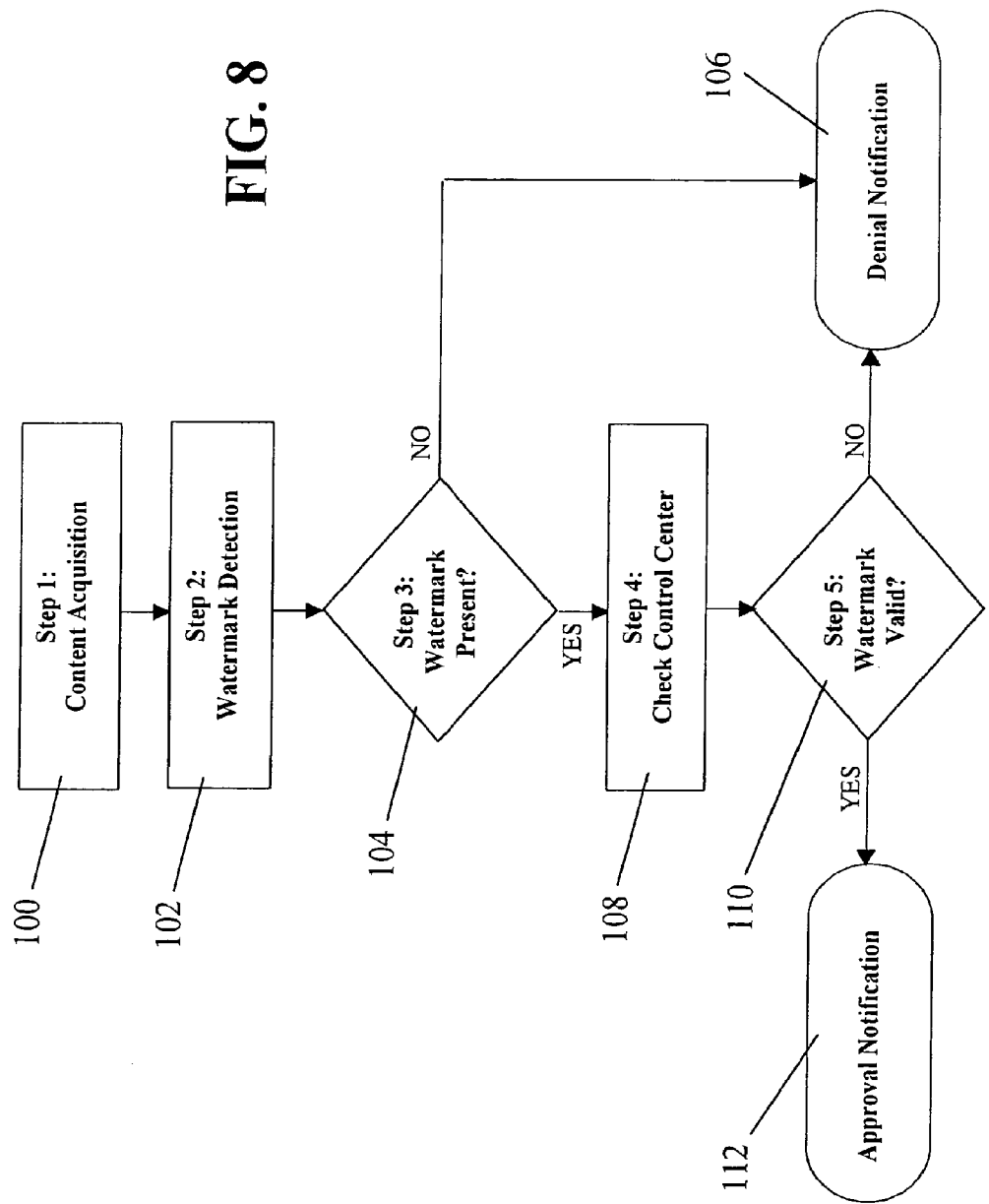
FIG. 8 is a step-by-step description of a fail-safe verification process.

The presence of additional watermarks may also be reported and logged. The connectivity between the database and the verifier may also be used to implement a fail-safe verification technique. This procedure is described in FIG. 8. The process starts in step 1, Content Acquisition 100, by acquiring the audio content prior to distribution for broadcast. In case of an audio-visual content, the audio portion must be separated from the visual content and the signals. If the audio is in analog form, it must be converted into digital form. In step 2, Watermark Detection 102, the content is checked for the presence of watermark. In step 3 (104), a decision is made based upon whether or not a watermark was detected in step 2. If embedded watermarks are not detected, a 'Denial Notification' 106 is issued. This notification could be in the form of a beep or a visual alert, or could include physical interference with the shipping procedure. Some examples of this physical interaction will be given shortly. If embedded watermarks are detected, in step 4, Check Control Center 108, watermark information is communicated back to the Control Center 18 and checked for validity. In step 5 (110), a decision is made to issue a 'Denial Notification' 106 for invalid watermarks or an "Approval Notification' 112 for valid watermarks. A detected watermark may be declared invalid, for example, if no matching metadata is found at the database, i.e., an orphan watermark, or if the watermark has expired or does not contain the proper embedder ID, etc.

Obviously, successful operation of the above system requires timely uploads of the embedder logs upon successful embedding of the content. An approval notice could be in the form a beep or visual cue as well as more sophisticated physical interaction with the workflow. For example, the verification system could be set up so that once an approval notice is issued, the audio filename is changed to conform to the shipping workflow specification. Alternatively or additionally, an approval label may be printed and placed to the disk or the tape that is used for the transportation of content. The complexity and reliability of the verification process strongly depends on workflow procedures and resources available at the verification sites. While in some instances, such as the system described in FIG. 6, the above fail-safe verification system may be an invaluable resource, in other architectures, such as the system of FIG. 2, it may not be economically feasible.

Optimized Detection and Reporting

One of the features of the disclosed monitoring system is that it allows transfer of a variety of information to the Control Center 18 upon successful completion of embedding. This includes embedder- and watermark-related ID information as well as other parameters, generally referred to as "detectability metric." Since the robustness of an embedded watermark is related to the characteristics of the particular audio segment, a set of embedded watermarks may exhibit different degrees of resiliency to channel distortions if embedded within different audio segments. Detectability metric, conveyed to the Control Center 18 after embedding of each segment, indicates how well the embedding process succeeded in encoding the content and predicts how reliably the embedded watermarks can be detected after undergoing various amounts of distortion and noise during broadcast and reception. This information may be provided to the users of the system, which in turn, may decide to increase the embedding strength to improve detection probability. Alternatively or additionally, the detectability metric may be used to diagnose why a certain embedded content may not have been detected at the monitoring sites. It will be later described how the detectability metric and SNR measurements can be combined to improve detection probability.

Among other information relayed to the Control Center 18, after embedding is the exact duration of the embedded segment. This way, upon extraction of watermarks it is possible to detect if the original clip has been shortened for broadcast. Note that some audio clips begin and/or end with silence, typically as a means for separation between clips, but sometimes due to presence of video without audio. During embedding, the initial silence interval is automatically detected and skipped; embedding starts only when audio signals are present. This feature is particularly helpful in detection of short clips, where loosing the initial portion of the first embedded watermark may affect overall detectability. The duration information for such clips can be more precisely determined by combining the information obtained from watermark detection with duration information contained in the database.

User selectable parameters such as watermark strength, dither algorithm, psycho-acoustic model for adjustment of watermark strength, etc. allow user control over transparency and/or detectability of the watermark. These parameters are included in the metadata and subsequently transferred to the database 38 and stored as the embedder log. The embedder log information can be used to optimize the reporting process. For example, if weak watermarks are being processed, only channels with good signal quality may be reported and if strong watermarks are being processed, marginal channels may be included as well.

Dynamic Decoding

Knowledge of watermark quality, prior to detection, coupled with knowledge of channel quality parameters, for example, the SNR value, the Bit Error Rate (BER), etc., can be used to implement a 'dynamic decoding' technique. There are several levels of error correction and packet detection strategies used during extraction of watermarks in the disclosed monitoring system. At one level, well-known error correction codes, for example Reed-Solomon and BCH codes, are used to detect erroneous watermark bits and subsequently correct them. Error correction capabilities may be further improved by probabilistically assigning 0 and 1 values to the extracted bits. This technique is also known as soft-decision decoding. Still, at a different decoding level, once a single watermark packet is successfully detected, forensic techniques are used to predict the presence or absence of future and past watermark packets. In addition, since watermarks in the present system are redundantly encoded, averaging techniques may be utilized to improve the detection probability.

In an error-free communications channel, where perfect embedding, transmission and reception of watermarks are carried out, such error correction and detection techniques are not needed. In all other cases, however, depending on the amount of noise in the channel, some or all of the above may become necessary. In such cases, certain parameters and thresholds must be selected to effect maximum detection while minimizing the probability of false watermark detections. Examples of these parameters include, but are not limited to, the following: maximum number of errors to be corrected by the Reed-Solomon decoder, number and threshold of probabilistic levels assigned to "soft" bits, minimum number of packets that needs to be collected for implementing averaging techniques, thresholds for forensic detection, etc. These parameters may further be dynamically optimized according to the quality of the particular transmission/embedding channel. The dynamic decoding technique, in its simplest form, entails having different sets of decoding parameters for differing channel qualities, i.e., for different SNR values. More sophisticated systems involve decoding of at least one watermark packet, searching the database to obtain the detectability metric for that segment and setting more or less aggressive decoding parameters based on channel quality-detectability combination. By way of example only, and not by way of limitation, decoder settings versus different channel quality and detectability levels are displayed in the following TABLE:

| Watermark Detectability | Channel Quality | Decoder Setting |
|---|---|---|
| Good | Good | Setting 1 |
| Good | Bad | Setting 2 |
| Bad | Good | Setting 3 |
| Bad | Bad | Setting 4 |

While only two levels of detectability and channel quality are shown in the TABLE above (either good or bad), it is appreciated that these parameters may be classified using more than two levels, in which case, more decoder settings may be necessary.

Real-Time vs. File Mode Embedding

As previously mentioned, the embedder may be implemented using software, hardware or a combination of both components. In addition, embedders may be used at different locations within the distribution chain, as described in FIG. 2, FIG. 5 and FIG. 6. Depending on the application, location, available resources and workflow, embedding may be done in real-time or file mode. In a file-mode implementation, audio watermarks are embedded into audio files without much consideration for delay or synchronization issues. Embedding can be done one file at a time, or on a series of files in what is called "batch processing."

Figure 9:
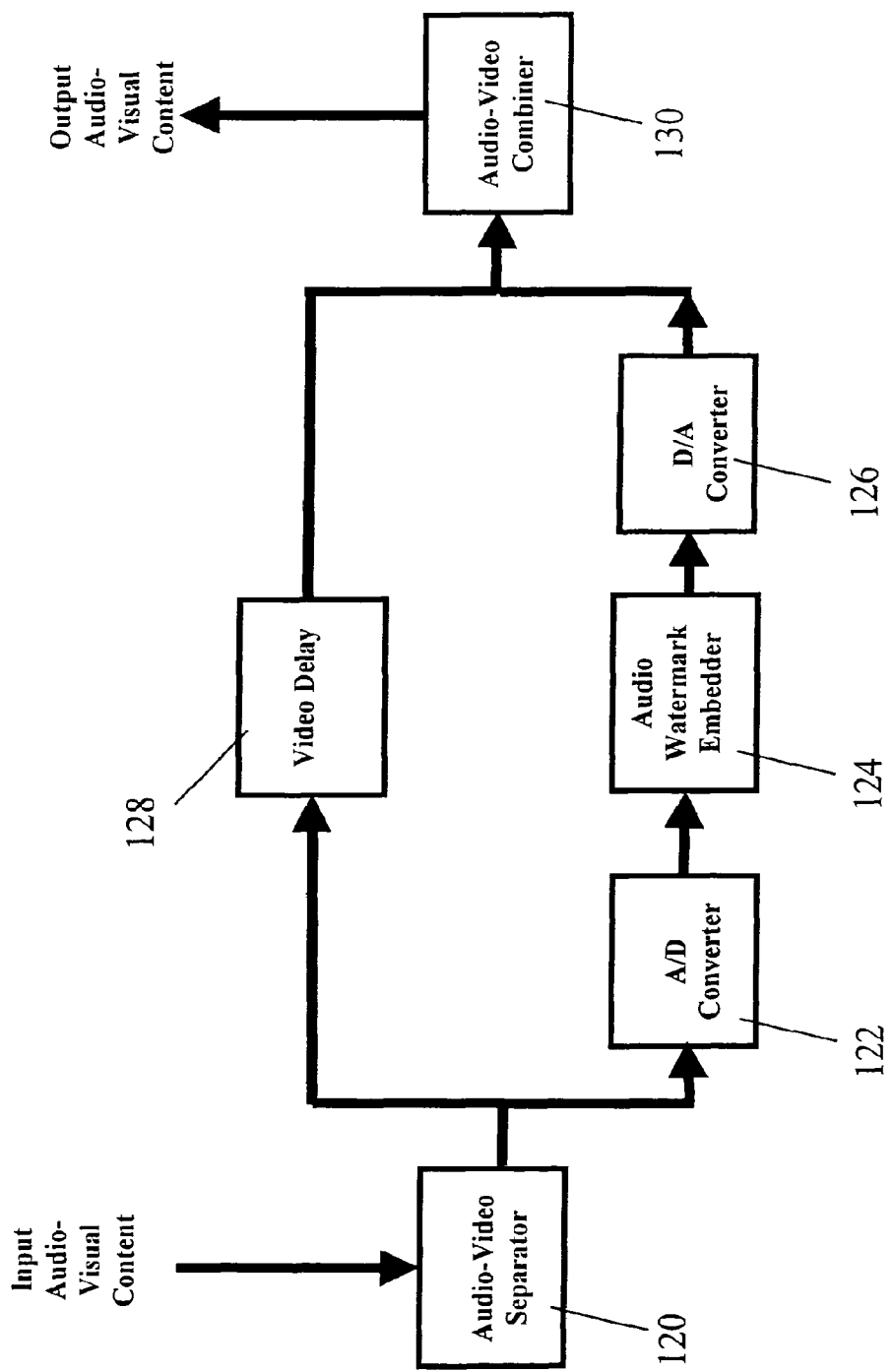
FIG. 9 is block diagram illustrating a real-time embedding process.

Real-time applications include embedding of live or streaming events, and applications where embedding is done during the transfer of content from one storage medium to another. The latter includes tape-to-tape, server-to-tape, server-to-disk, tape-to-disk and other transfers of recorded audio or audio-visual information. The challenging task of a real-time encoder is to embed the audio watermark while maintaining synchronization between the audio and video portions of the input signal. FIG. 9 shows a block diagram of an exemplary real-time encoding system for an analog audio-visual input signal. In accordance with this figure, after multimedia components are separated in Audio-Video Separator 120, the analog audio signal is digitized in the A/D Converter 122, embedded in Audio Watermark Embedder 124, and converted back into analog form, in D/A Converter 126, while the video portion remains idle in the video delay block 128. Next, the embedded audio is combined with the corresponding video signal in Audio-Video Combiner 130 and is made available for further processing and/or transmission. The video delay block 128, shown in FIG. 9, accommodates fixed pipeline delays in the system and ensures proper audio-video synchronization. These delays may be due to internal and/or external loading and transfer of audio data; typically a video delay buffer of a few video frames is sufficient. The real-time watermarking engine depicted in FIG. 9 needs to process the incoming audio signal at a fast enough rate to maintain synchronization with the corresponding video frames. In NTSC-encoded video, frames are separated by approximately 33 milliseconds; it is desired to maintain synchronization to within a fraction, for example, one-tenth, of one frame duration. It is possible, with today's microprocessor capabilities, to implement such an engine using entirely software modules. However, if more embedding features and/or processing steps are added, real-time embedding using an all- or part-hardware implementation may be preferable.

Other variations of the system of FIG. 9 are certainly possible. For example, in an all-digital system, A/D and D/A conversions are not necessary yet it may become necessary to process compressed input signals. In such systems, the input audio and/or video signals must be decompressed, embedded with audio watermark and then converted back to their original compressed format. In other exemplary systems where audio and video portions of the input signal are completely separate from each other, audio-video separation 120 and combination 130 modules, depicted in FIG. 9, become irrelevant. Still, in other systems, metadata streams containing information such as time code, are included in the audio and video signals. In such systems, not only audio, video and metadata streams need to be separated, but also synchronization must be maintained among multiple streams. Finally, batch processing can also be made possible in a real-time embedding system by providing an embedding list of time instances when a new clip begins and ends.

Local, Regional and National Monitoring

Given the vast geographical coverage of the disclosed monitoring system, it is possible to provide monitoring capability at local, regional and national levels. This feature is particularly useful for monitoring radio and TV commercials where local media distributors may (or may not) replace the national advertisements with local ads. Since such replacements are not done on a regularly scheduled basis, it is important for the content owners to precisely know when, where and how many times their program segment was broadcast. Using the present invention's satellite, cable and Internet monitoring capabilities, it is possible to provide such detailed reports to the customers. The detection results are collected at the Control Center 18 and processed in order to generate the pertinent information for each advertiser.

Redundant Monitoring

The monitoring capabilities of the present invention may be further enhanced by taking advantage of a redundant network of receivers. Redundant monitoring is accomplished in several ways. Multiple receivers may be able to monitor the same station because of geographical coverage overlap between monitoring sites. In addition, the same content may be monitored simultaneously through different types of channels such as over-the-air, local and national cable broadcast channels. It is also possible to intentionally tune multiple receivers, of the same channel type, to the same station in order to improve reliability of detection and/or for troubleshooting purposes. Redundant monitoring can be used to improve the accuracy of timing information generated for detected clips. Such information may be used, for example, to tie a commercial to a particular show.

Channel Quality Assessment

As noted above, the quality of received RF signals, volume levels, and other signal parameters can be monitored at the monitoring sites. In addition, SNR values corresponding to individual channels can be continually calculated for the incoming signals throughout the monitoring system. The above parameters can be evaluated regardless of the presence or absence of watermarked content. It is additionally possible to use the detected watermarks for channel quality assessment. For example, it is possible to determine whether or not the broadcast content has undergone time compression by measuring the duration of detected watermarks. Time compression artifacts may arise due to ordinary processing of content via substandard equipment or could be the result of intentional processing by an unscrupulous broadcaster in order to make room for additional advertisements. Nevertheless, it is important for the customer to be aware of such possible channel impairments. Similarly, it is possible to measure wow and flutter, typically associated with analog tape players, and the amount of noise in the broadcast channel (e.g., by measuring bit-error-rate). Analyzing the quality of detected watermarks in the frequency domain and assessing the extent and type of damage to watermarks in each frequency band can also shed light on possible frequency domain impairments such as bandpass filtering and compression. The information regarding channel quality can be provided to the interested customers as well as broadcasters. They can also provide a measure of confidence about detection rates on particular channels.

Network Identification

One of the watermark layers deployed in the present monitoring system is utilized by the Radio and Television Networks to identify and monitor the times and programs where a network affiliated local station is carrying the network's broadcast signal. This information may be important to the networks in order to measure and verify compliance. In the case where content is distributed to the network as local or regional stations, this capability allows for differentiating the different sources. Real-time embedders may be deployed in the network facilities to ensure all content is watermarked.

International Deployment

The Broadcast Monitoring Network may also be expanded internationally, allowing content encoded in one country to be detected at the country of origin or in any other country where monitoring devices are available. For the purpose of maintaining compatibility, a set of design constraints is defined for the various subsystem blocks. These constraints may be classified in two categories, where the first category contains the physical and logical layers of the system and the second has more to do with the metadata and detection data exchange. These constraints include, and are not limited to, the definition of certain core rules that govern the underlying watermarking technology and how it is applied in the broadcast monitoring system, the minimum set of data fields that insure proper dialog between systems in the different countries.

Content Tracing

The broadcast monitoring may also reveal the unauthorized airing of certain content, in cases where the content is earmarked for preview only or before official releases. A set of rules around the metadata of such content will allow for the tracing of the aired copy.

Other Applications

Monitoring and data collection capabilities of the present invention can be utilized in other ways, as well. One such application relies on the fact that most people may not pay particular attention to radio and TV commercials at the exact moment of their broadcast. Yet, at some later time, when they are in search of a particular service or product, they may become interested in special promotions and discounts. The advantage of the disclosed monitoring system is that it retains the exact knowledge of time and geographical location of certain broadcast commercials. It also has the capability of replaying those commercials by directly accessing the stored audio logs. In addition, if certain information about the content, for example, a contact phone number or an Internet link, is included in the embedder log for each content, the Control Center database 38 is further capable of providing such contact information to an interested consumer. These features of the present monitoring system make it a suitable candidate for becoming a secondary source of direct advertisement for targeted audiences based on geographical location. As an example, someone that is interested in buying a car may use the present system to obtain a list of all auto-related advertisements, promotions or discounts that have aired in a particular region in the span of a few days. In addition, the present system can provide a replay/reprint capability of commercials for the interested consumer. In effect, this system becomes a repository of aired commercials that are readily available for re-utilization.

There are many possibilities on how to access this system. Connectivity to the system may be realized through a variety of means, some of which include an Internet connection, a cell phone, a PDA with connectivity, a TV with connectivity, a car radio with cell phone connectivity, a GPS car navigation system with connectivity, etc. Implementation of this system requires expansion of the system resources in order to cope with increased access and processing demands. It also requires a large base of embedded broadcast content in order to provide sufficient diversity in the database of stored advertisements.

Based on the port of entry and capabilities of devices available to the consumer, the commercials may be replayed in full or referenced in an abbreviated manner (e.g., www address, phone number, etc.). The user interface can also have sorting and searching capabilities and may even automatically alert the user if a commercial is played that meets a pre-selected criterion tailored to the user's liking. Other possibilities include printing out the commercial in text form (via for example, conversion of the audio log segments to text form via voice-to-text software), automatically dialing a phone number, mapping the location of the advertiser on a GPS navigation system, or even buying the product.

One advantage of the above system is that commercials need to only air in one medium (for example, on the local AM station) yet, they can be made available to a wide range of audiences that access the system's repository. Further extensions can involve inclusion of print media commercials into the system; metadata for all local print media may be routed to the local monitoring station or directly to the Control Center.

As is evident from the foregoing description, certain other aspects of the invention are not limited to the particular details of the embodiments illustrated, and it is therefore contemplated that other modifications and applications will occur to those skilled in the art.

What is claimed is:

1. A method for embedding of watermarks comprising identification information into a multimedia content, comprising:
    separating at least one audio component from other components of the multimedia content that is being received in real-time;
    embedding the separated audio component(s) imperceptibly and repeatedly with the watermarks comprising the identification information; and
    combining the other components of the multimedia content with the embedded audio component(s), while using a video delay unit configured to store a video component in a buffer as the separated audio component(s) are being embedded so as to accommodate delays caused at least in-part by embedding of the audio component, so that synchronization between segments of the other components of the multimedia content and corresponding segments of the embedded audio component(s) is preserved, wherein upon an indication that the at least one audio component is in analog form, converting the at least one audio component into digital form prior to the embedding and converting the at least one audio component back into analog form after the embedding.

2. The method of claim 1, wherein the multimedia content includes audio and video portions.

3. The method of claim 1, wherein the multimedia content is in compressed digital form.

4. The method of claim 3, further comprising:
    decompressing the at least one audio component of the compressed multimedia content prior to the embedding; and
    compressing the embedded audio component(s) prior to combination with the other components of the multimedia content.

5. The method of claim 1, wherein the multimedia content includes a metadata stream.

6. The method of claim 5, wherein the combining comprises combining the other components of the multimedia content with the embedded audio component(s) so that synchronization between the metadata stream and the corresponding segments of the embedded audio component(s) is preserved.

7. The method of claim 5, wherein the metadata includes a time code.

8. The method of claim 1, further comprising enabling batch processing by providing an embedding list of time instances that indicate when a new clip of the multimedia content begins and ends.

9. The method of claim 1, wherein:
    the multimedia content includes at least three streams of data prior to the separating, the three streams including an audio stream corresponding to the audio component(s), a video stream corresponding to the video component, and a meta data stream comprising time codes; and
    the combining is carried out so that synchronization between segments of the video and meta data streams and the corresponding segments of the embedded audio component(s) is preserved.

10. An apparatus, comprising:
    an audio-video separator circuitry configured to separate audio and video components of a multimedia content that is being received in real-time;
    an audio watermark embedder circuitry configured to embed at least one audio component imperceptibly and repeatedly with identification information;
    an audio-video combiner circuitry configured to combine the video component(s) with the embedded audio component(s) so that synchronization between video frames of the video component and corresponding segments of the embedded audio component(s) is preserved; and a video delay unit configured to store the video component(s) in a buffer while the audio watermark embedder embeds the audio component(s) so as to accommodate delays caused at least in-part by embedding of the audio component; and
    an analog-to-digital converter and a digital-to-analog converter configured to, upon an indication that the at least one audio component is in analog form, convert the audio component(s) into digital form prior to embedding the at least one audio component and convert the at least one audio component back into analog from after embedding.

11. The apparatus of claim 10, wherein the multimedia content is in compressed digital form.

12. The apparatus of claim 11, further comprising:
    a decompression unit configured to decompress the audio component(s) prior to embedding the audio component(s); and
    a compression unit configured to compress the embedded audio component(s) prior to combination with the remaining portion of the multimedia content.

13. The apparatus of claim 10, wherein the multimedia content includes a metadata stream.

14. The apparatus of claim 13, wherein the audio-video combiner circuitry is configured to combine the video component(s) and the metadata stream with the embedded audio component(s) so that synchronization between the metadata stream and the corresponding segments of the embedded audio component(s) is preserved.

15. The apparatus of claim 13, wherein the metadata includes a time code.

16. The apparatus of claim 10, further comprising a batch processor configured to process an embedding list of time instances that indicate when a new clip of the multimedia content begins and ends.

17. The apparatus of claim 10, wherein:
    the multimedia content includes at least three streams of data prior to separating the audio and the video component(s), the three streams including an audio stream corresponding to the audio component(s), a video stream corresponding to the video component, and a meta data stream comprising time codes: and
    the audio-video combiner circuitry is configured to preserve synchronization between segments of the plurality of streams of data video and meta data streams and the corresponding segments of the embedded audio component(s).

18. A computer program product, embodied on a non-transitory computer readable medium and including program code that upon execution by the processor causes that processor to embed watermarks into a multimedia content, the computer program product comprising:

program code for separating at least one audio component from other components of
the multimedia content that is being received in real-time;
program code for embedding the separated audio component(s) imperceptibly and repeatedly with watermarks comprising identification information; and
program code for combining the other components of the multimedia content with the embedded audio component(s), while using a video delay unit configured to store a video component in a buffer as the separated audio component(s) are being embedded so as to accommodate delays caused at least in-part by embedding of the audio component so that synchronization between segments of the other components of the multimedia content and corresponding segments of the embedded audio component(s) is preserved, wherein upon an indication that the at least one audio component is in analog form, the computer program product including program code for converting the at least one audio component into digital form prior to the embedding and converting the at least one audio component back into analog form after the embedding.

* * * * *